(12) United States Patent
Junkers et al.

(10) Patent No.: US 12,330,272 B2
(45) Date of Patent: Jun. 17, 2025

(54) APPARATUS FOR TIGHTENING THREADED FASTENERS

(71) Applicant: HYTORC Division UNEX Corporation, Mahwah, NJ (US)

(72) Inventors: Eric P. Junkers, Mahwah, NJ (US); Peter Fortoloczki, Essex Fells, NJ (US); Thomas F. McLoughlin, Montclair, NJ (US); Richard J. Raska, River Edge, NJ (US)

(73) Assignee: HYTORC Division UNEX Corporation, Mahwah, NJ (US)

( * ) Notice: Subject to any disclaimer, the term of this patent is extended or adjusted under 35 U.S.C. 154(b) by 37 days.

(21) Appl. No.: 18/103,444

(22) Filed: Jan. 30, 2023

(65) Prior Publication Data

US 2023/0390903 A1 Dec. 7, 2023

Related U.S. Application Data

(62) Division of application No. 16/079,435, filed as application No. PCT/US2017/019541 on Feb. 24, 2017, now Pat. No. 11,590,633.

(60) Provisional application No. 62/299,110, filed on Feb. 24, 2016.

(51) Int. Cl.
| | |
|---|---|
| *B25B 1/00* | (2006.01) |
| *B25B 21/00* | (2006.01) |
| *B25B 23/145* | (2006.01) |
| *B25F 5/00* | (2006.01) |
| *G05D 16/10* | (2006.01) |
| *G05G 5/00* | (2006.01) |

(52) U.S. Cl.
CPC ............ *B25B 21/008* (2013.01); *B25B 21/00* (2013.01); *B25B 23/145* (2013.01); *B25F 5/001* (2013.01); *B25F 5/005* (2013.01); *G05D 16/103* (2013.01); *G05G 5/005* (2013.01)

(58) Field of Classification Search
CPC ....... B25B 21/00; B25B 21/008; B25B 21/02; B25B 23/145; B25B 23/14; B25B 23/147; B25B 23/0064; B25B 23/141; B25F 5/001; B25F 5/02; B25F 5/00
USPC ......................................................... 173/178
See application file for complete search history.

(56) References Cited

U.S. PATENT DOCUMENTS

| | | | | |
|---|---|---|---|---|
| 6,165,096 | A * | 12/2000 | Seith .................. | F16H 61/0295 475/265 |
| 9,017,209 | B1 * | 4/2015 | Seith ..................... | B25F 5/001 475/297 |
| 2003/0010514 | A1 * | 1/2003 | Taga ..................... | B25F 5/00 173/213 |
| 2013/0081839 | A1 * | 4/2013 | Tully .................... | B25F 5/02 137/115.18 |

\* cited by examiner

*Primary Examiner* — Jacob A Smith
(74) *Attorney, Agent, or Firm* — Justin B. Bender, Esq.

(57) ABSTRACT

A pneumatic fluid directional valve assembly for pneumatic torque tools controls and optimizes directional airflow for tightening and loosening threaded fasteners. The assembly includes an outer pneumatic valve portion, an inner pneumatic valve portion, and a push button rod assembly. The outer and inner valve portions form a relatively rotatable unit actuated by the push button rod assembly to direct airflow via various inlet and exhaust ports, slots, faces, passages, and sleeves. In another embodiment, the assembly includes a trigger lock safety feature to enhance operational safety.

26 Claims, 29 Drawing Sheets

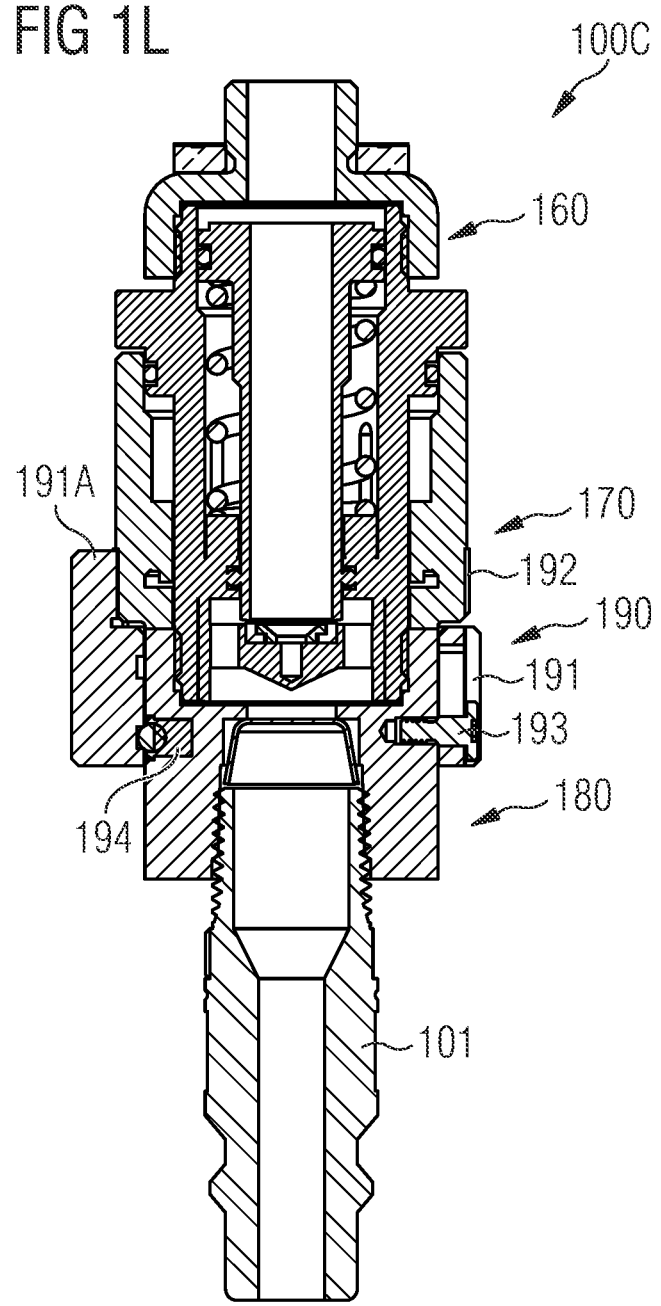

FIG 2A1
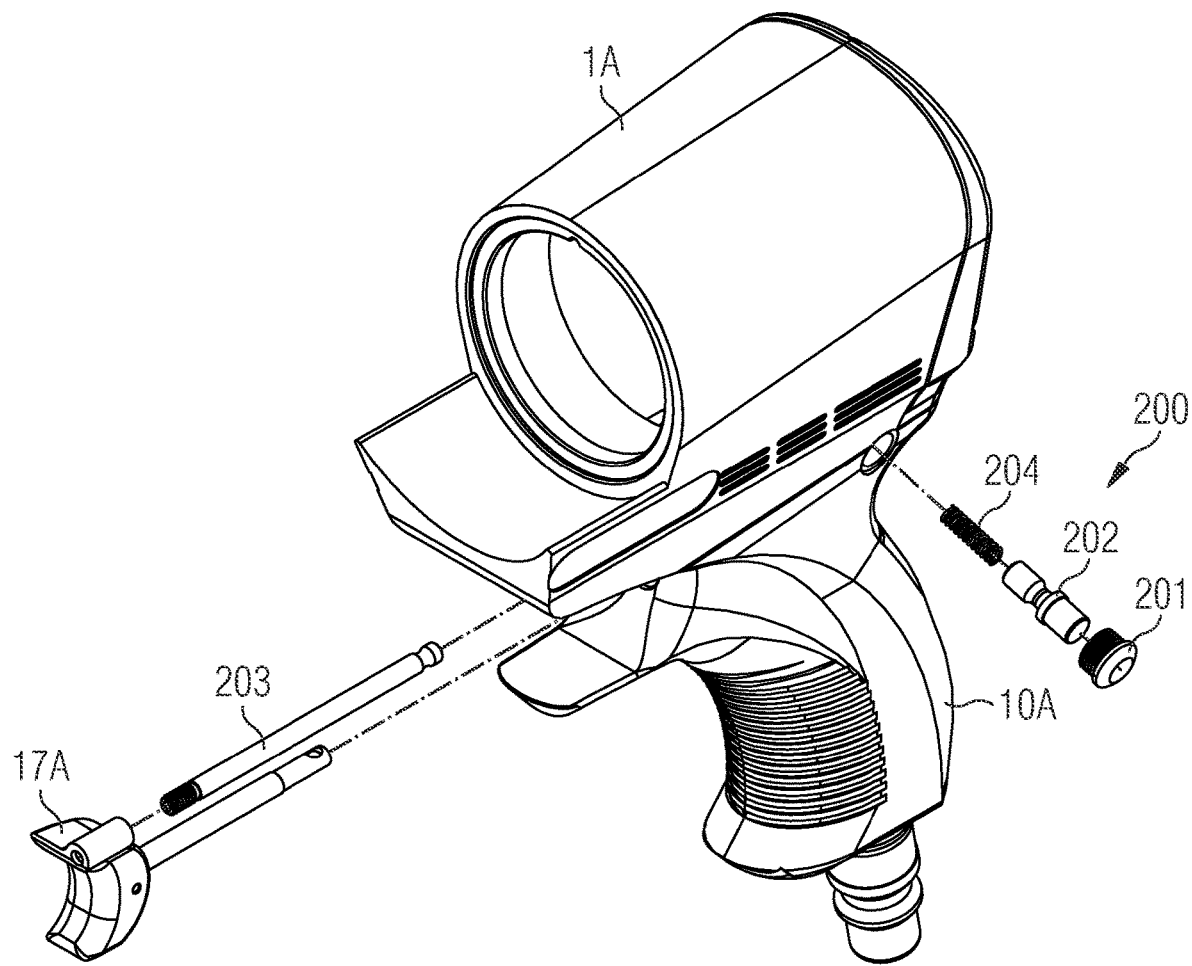

FIG 2A2
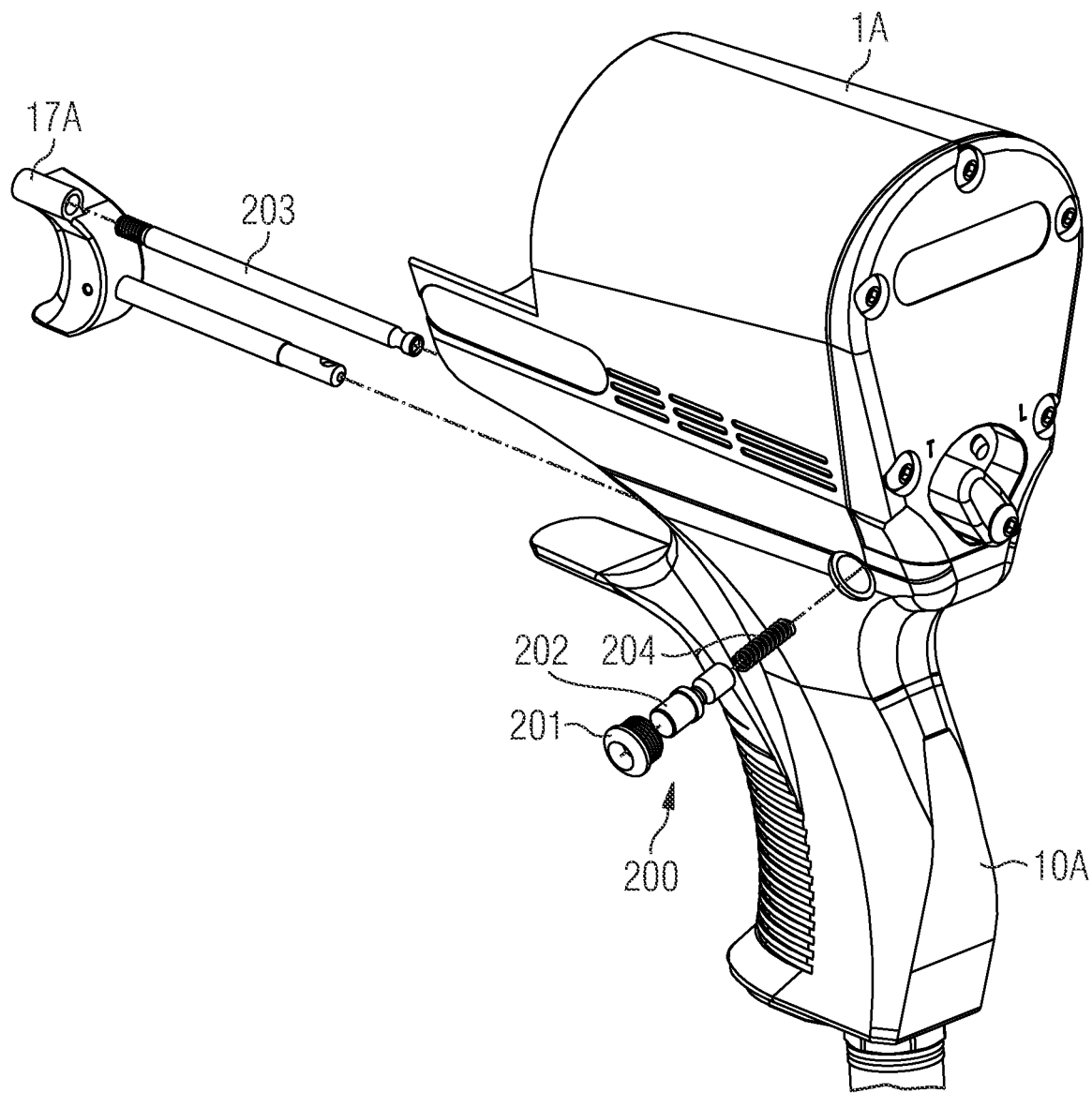

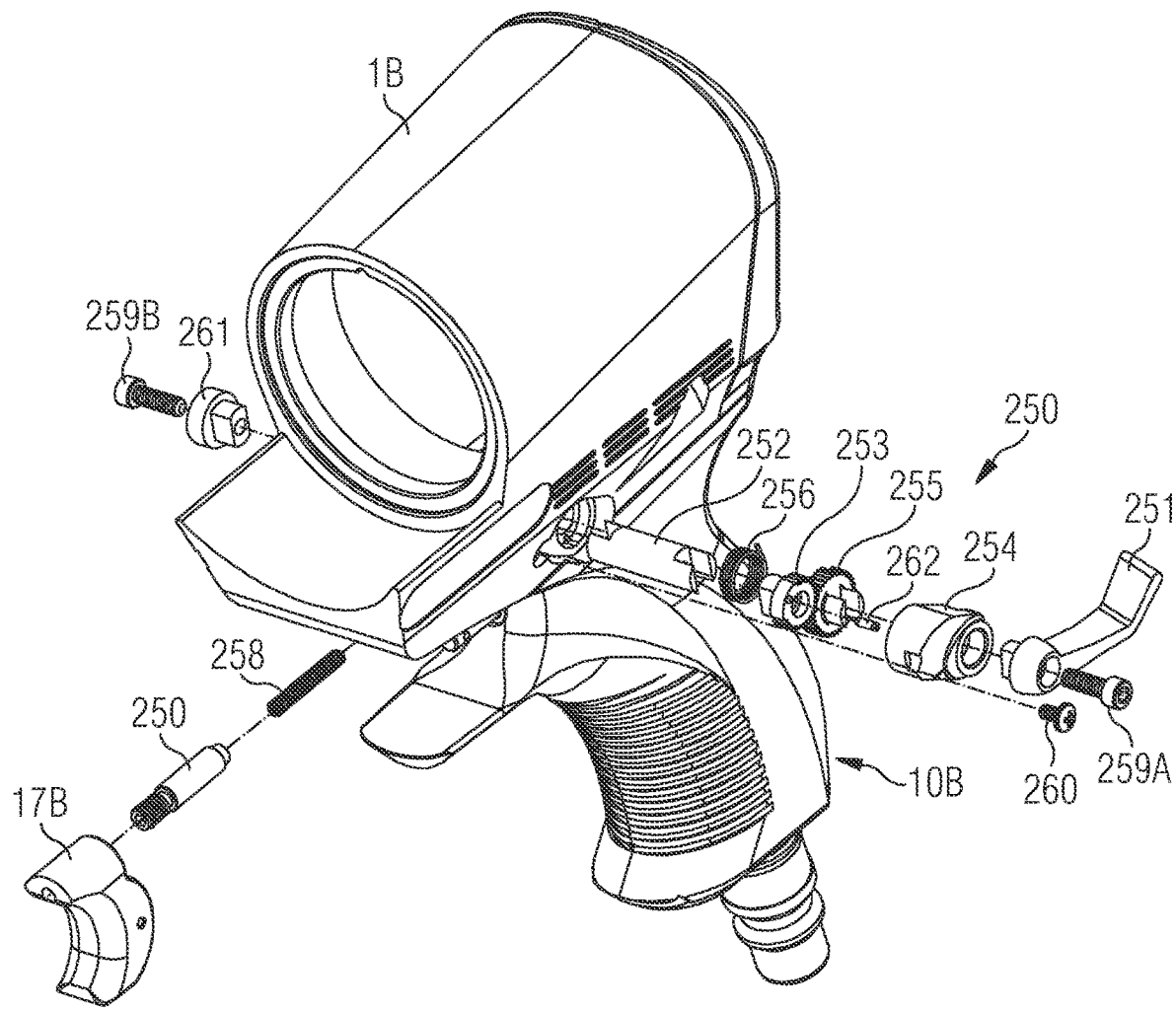
FIG 2B1

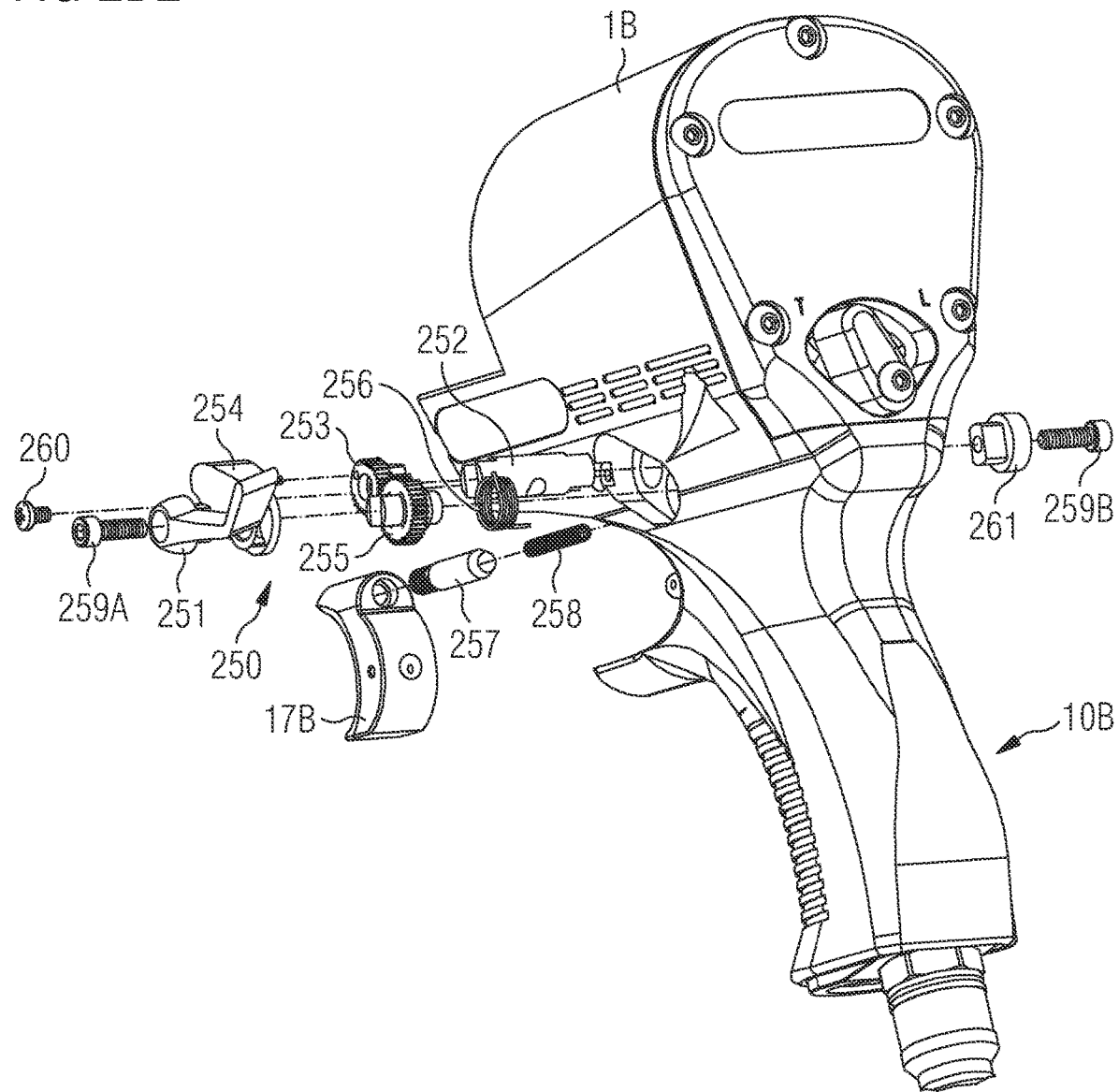
FIG 2B2

HSLT Mode

LSHT Mode

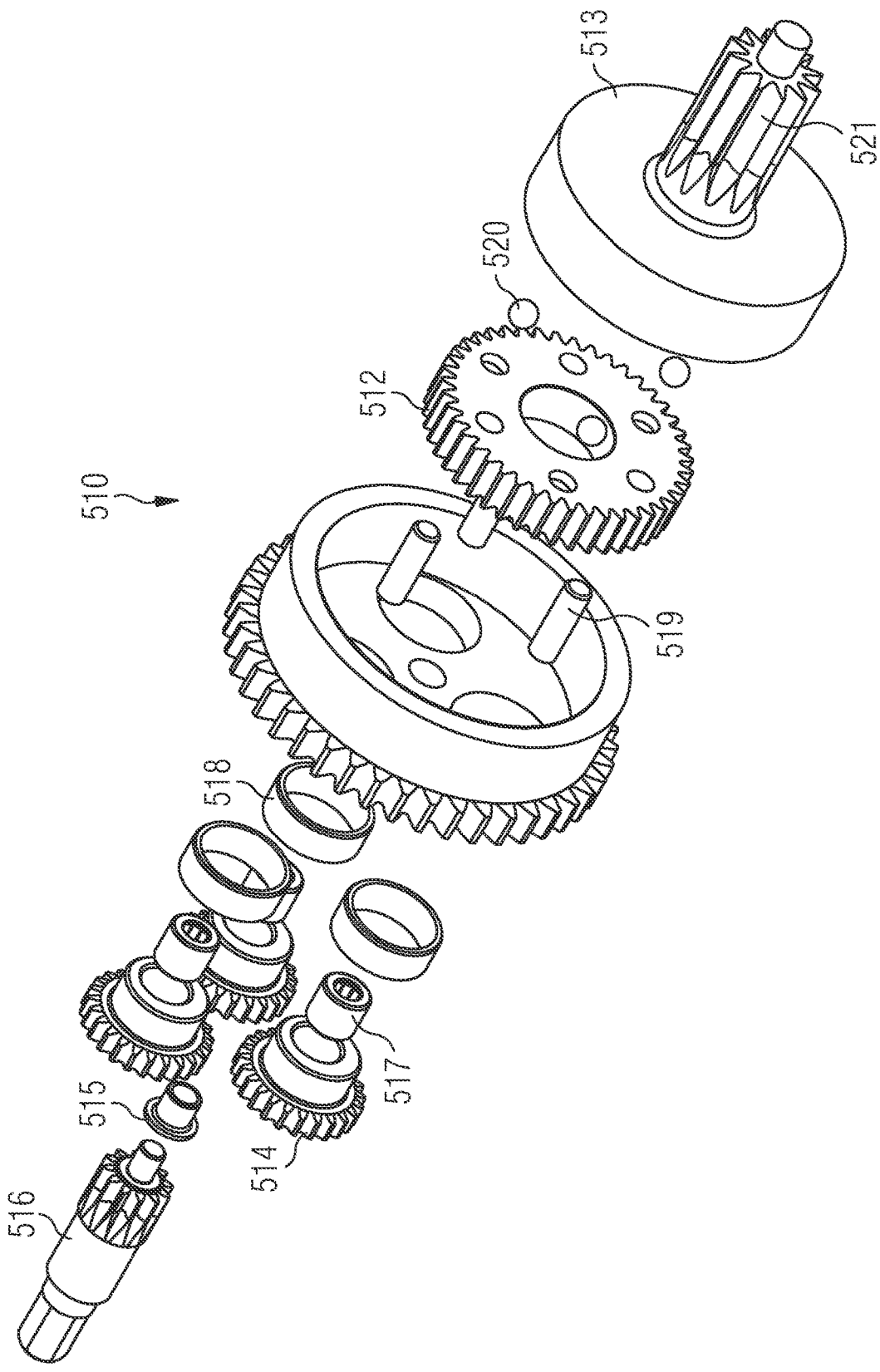

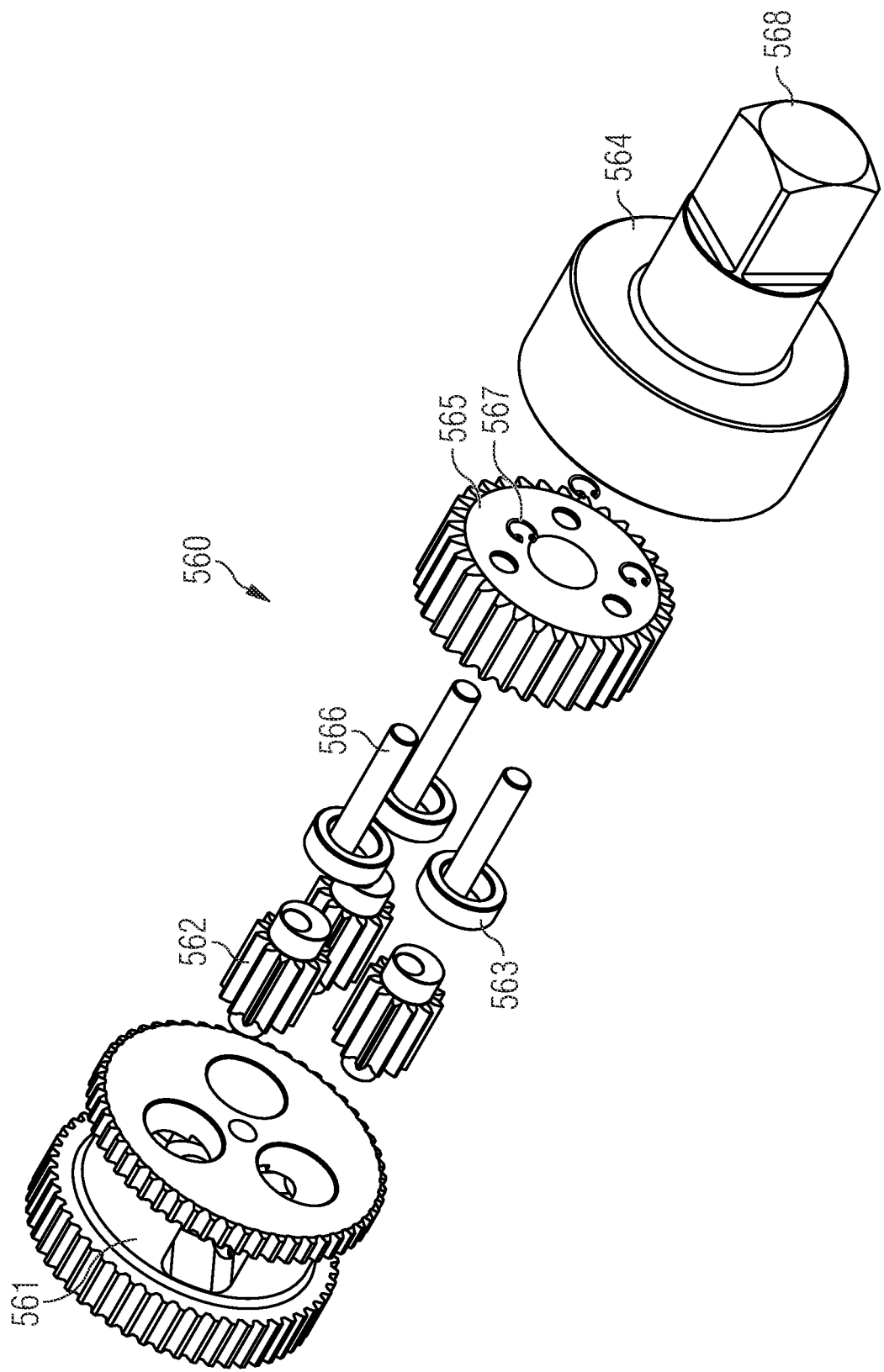

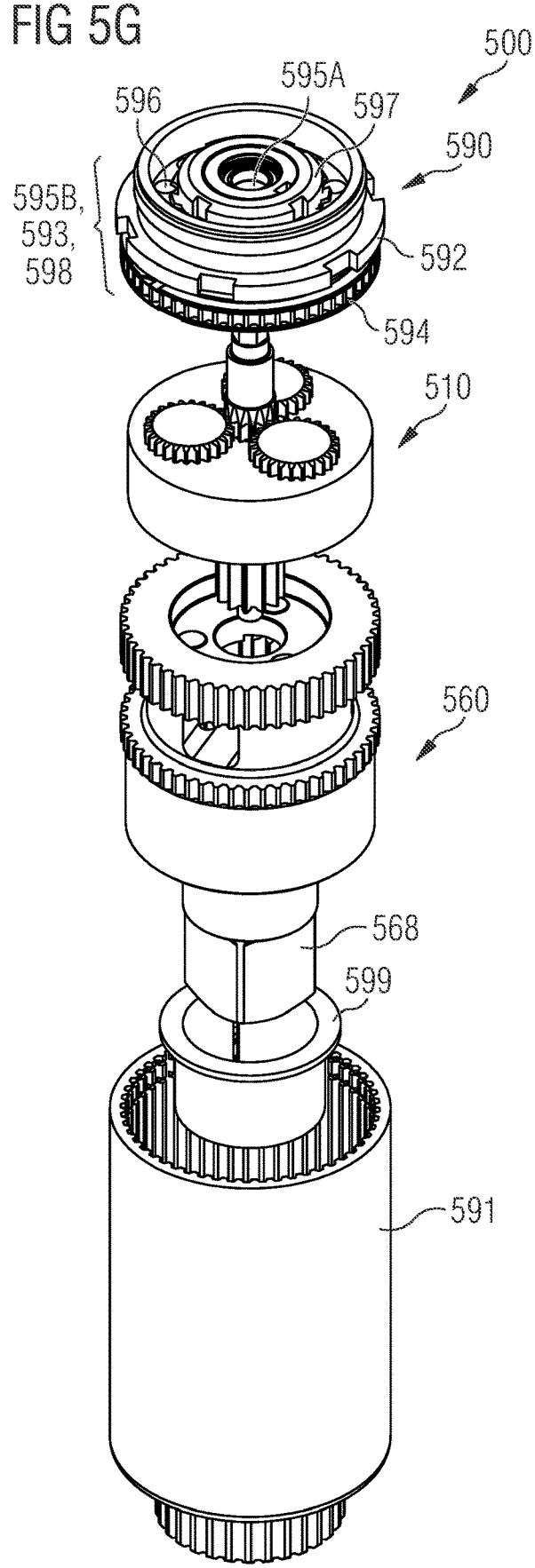

APPARATUS FOR TIGHTENING THREADED FASTENERS

CROSS-REFERENCE TO RELATED APPLICATION

This application is a divisional application of co-pending U.S. application Ser. No. 16/079,435, having Filing Date of 23 Aug. 2018, entitled "APPARATUS FOR TIGHTENING THREADED FASTENERS", an entire copy of which is incorporated herein by reference and from which the present application claims its priority under 35 USC 119(a)-(d).

This application either claims priority to and/or is either a continuation patent application or a continuation-in-part application of the following patent application, an entire copy of which is incorporated herein by reference: U.S. Application Ser. No. 62/299,110, having Filing Date of 24 Feb. 2016, entitled "APPARATUS FOR TIGHTENING THREADED FASTENERS".

BACKGROUND

Torque power tools are known in the art and include those pneumatically, electrically and hydraulically driven. Torque power tools produce a turning force to tighten and/or loosen threaded fasteners and an equal and opposite reaction force.

Over the years, Applicant has applied its thorough understanding and innovation in torque power tools to hand-held electric and pneumatic torque intensifying tools, specifically by creating the HYTORC® jGUN®, FLIP-Gun®, THRILL®, Z° Gun, FLASH™ and LITHIUM Series™ product lines and drivers and tools for use therewith. Evolution of these product lines is disclosed, by way of example, in Applicant's U.S. application Ser. Nos. and U.S. Pat. Nos. 6,490,952; 6,609,868; 6,929,439; 6,883,401; 6,986,298; 7,003,862; 7,066,053; 7,125,213; 7,188,552; 7,207,760; 7,735,397; 7,641,579; 7,798,038; 7,832,310; 7,950,309; 8,042,434; D608,614; 13/577,995; PCT/US2014/69996; PCT/US2014/71000; and 62/159,950, entire copies of which are incorporated herein by reference.

The present inventions address evolving industrial bolting needs with respect to these Applicant product lines.

Figure 3A:
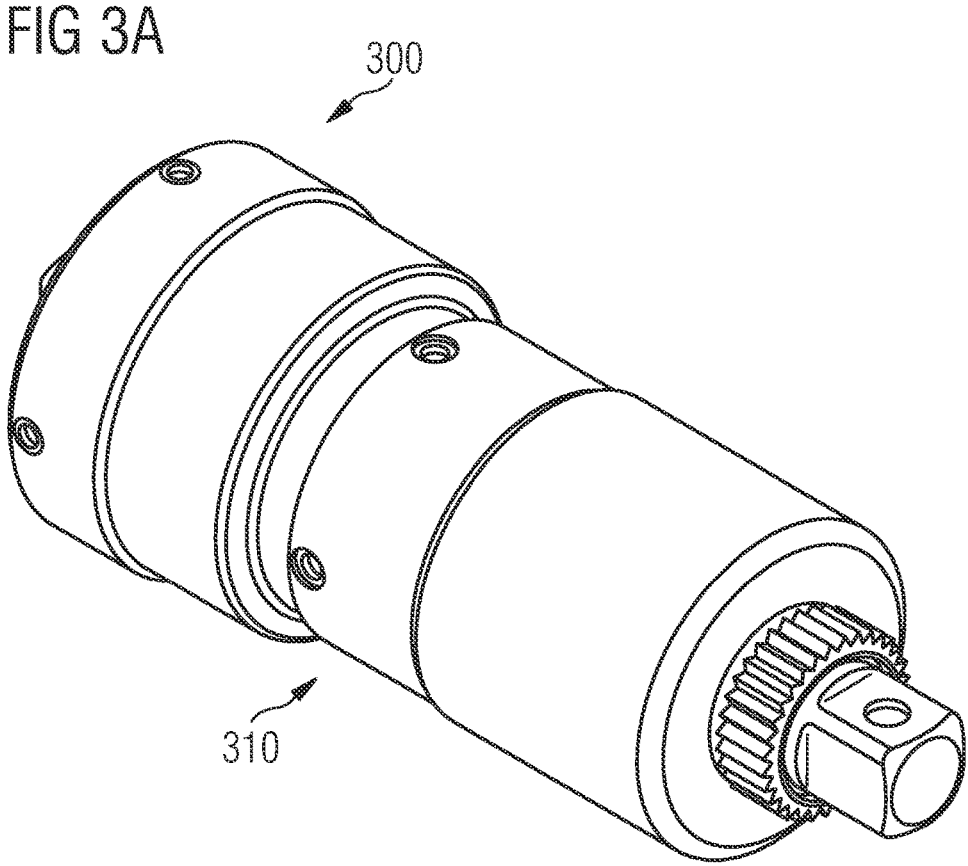
Figure 3B:
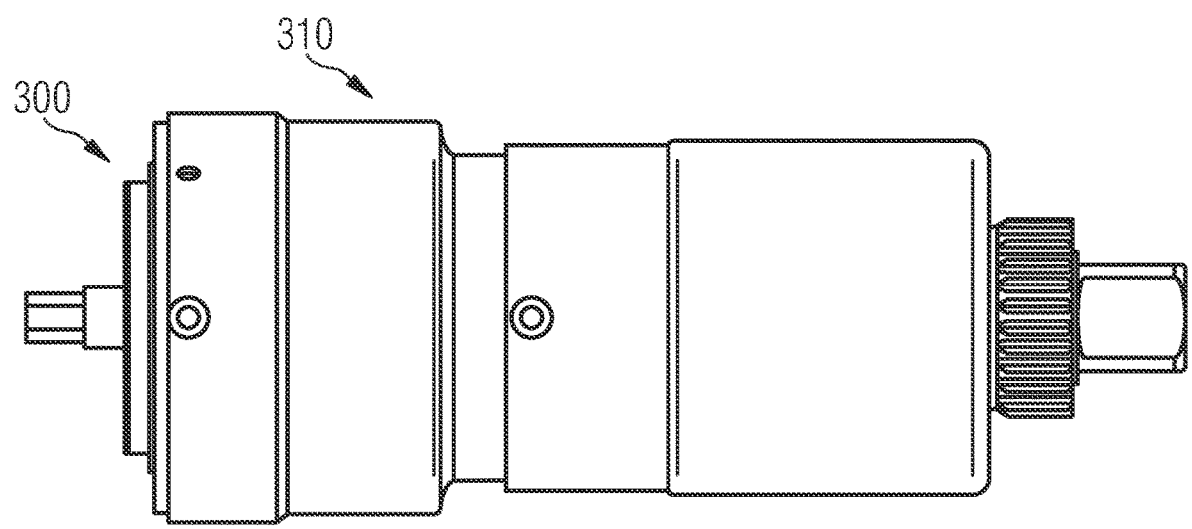
Figure 3C:
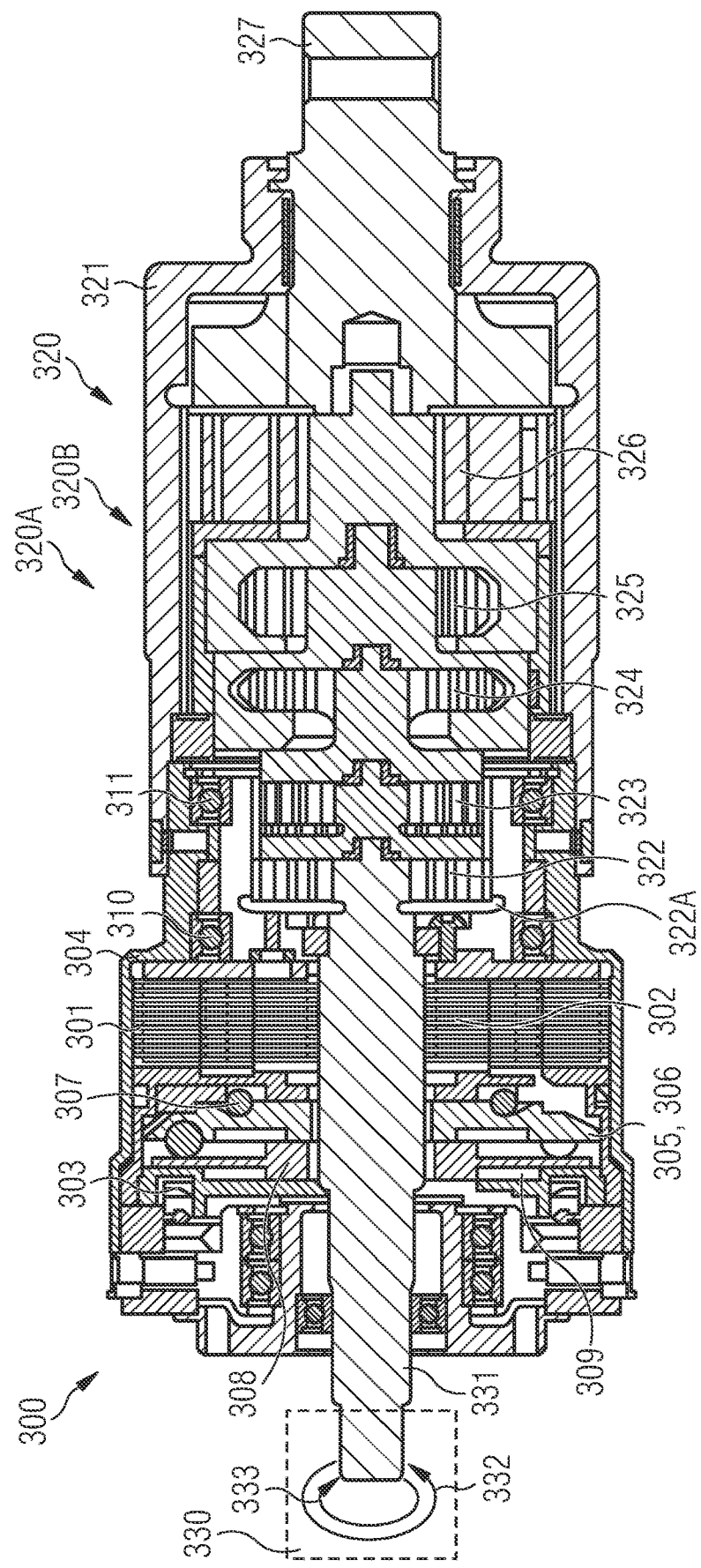
Figure 5A:
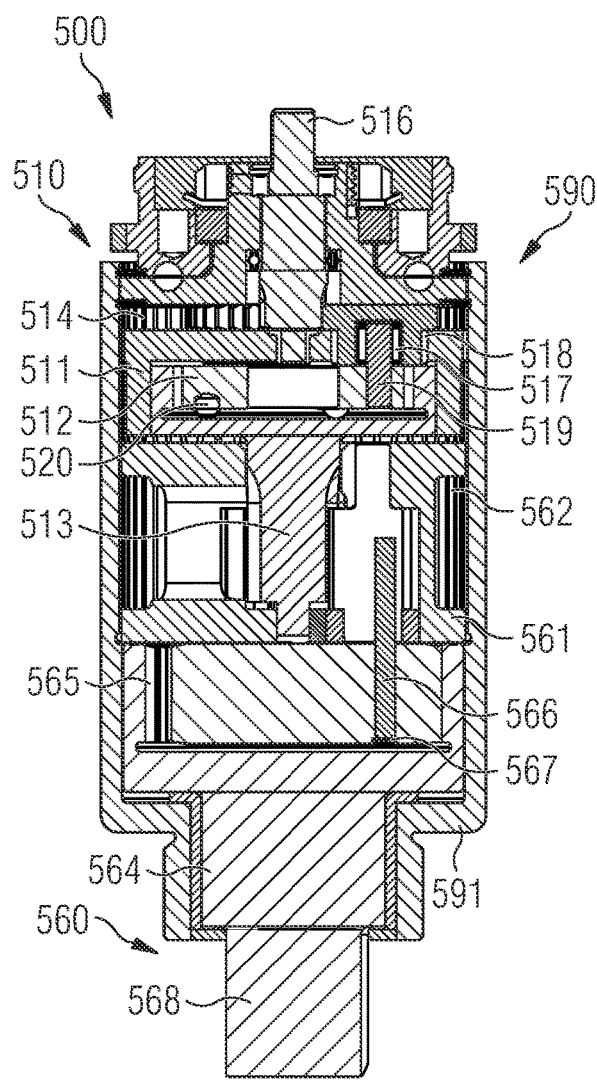
Figure 5B:
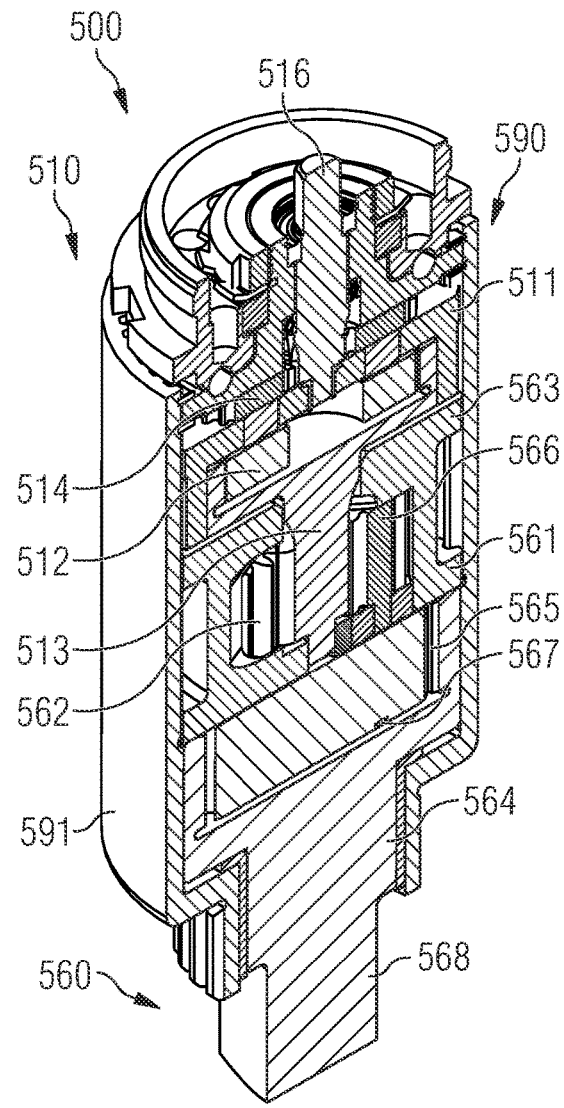
Figure 5C:
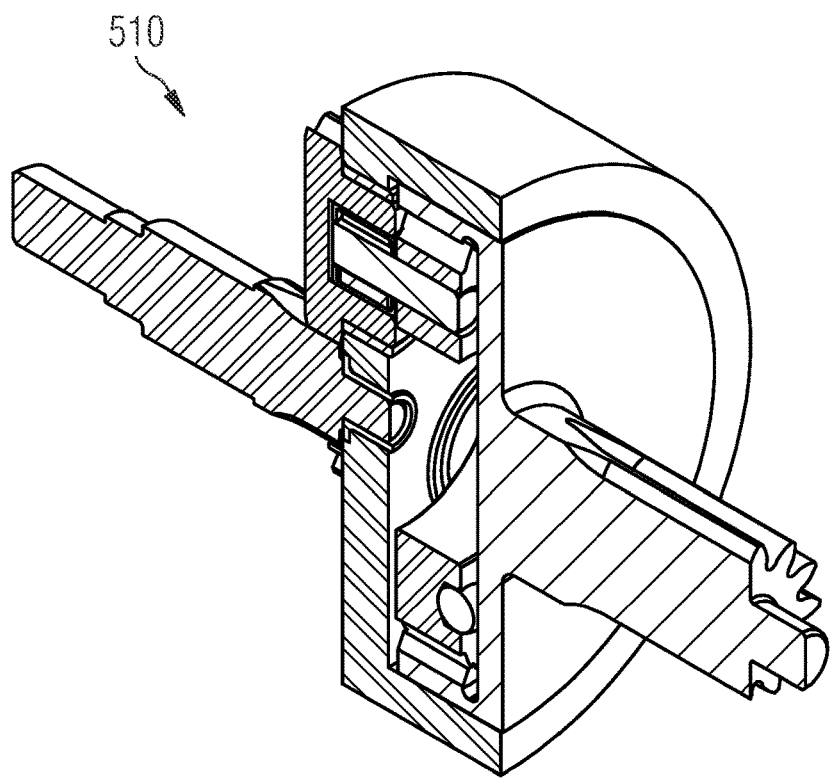
Figure 5D:
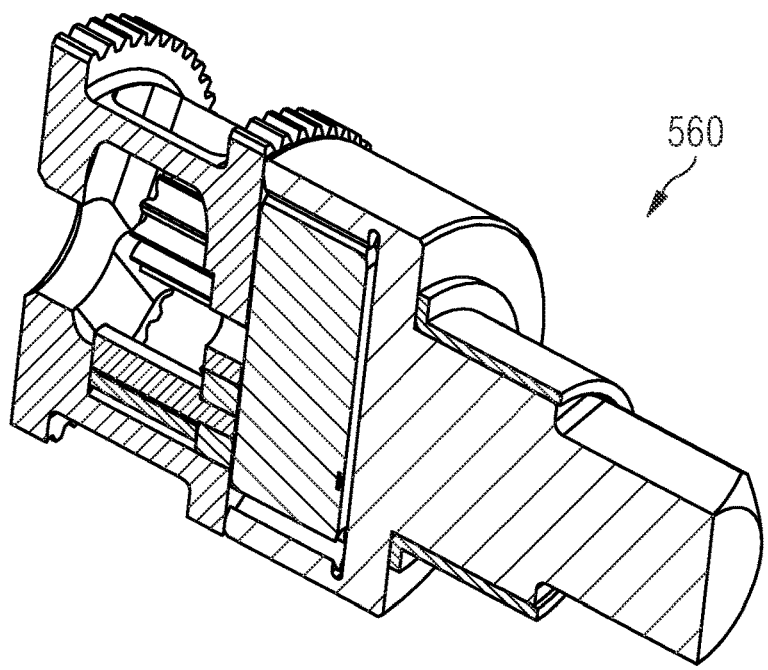
Figure 6B:
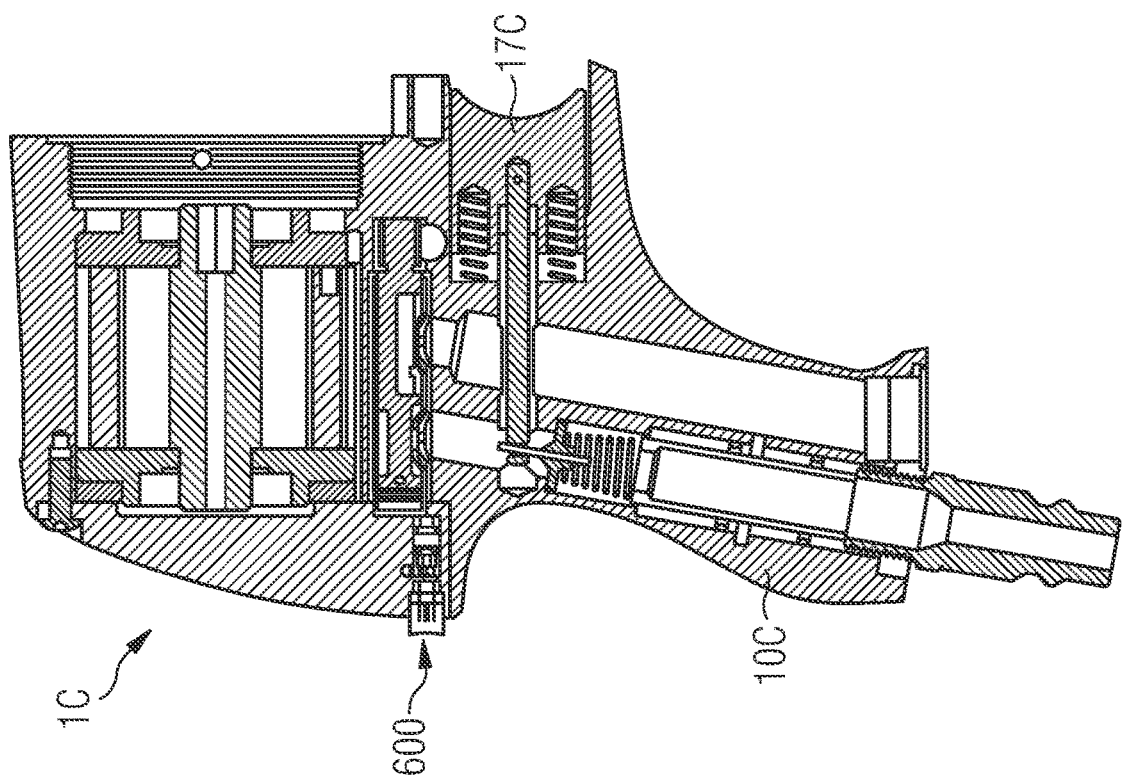
Figure 6A:
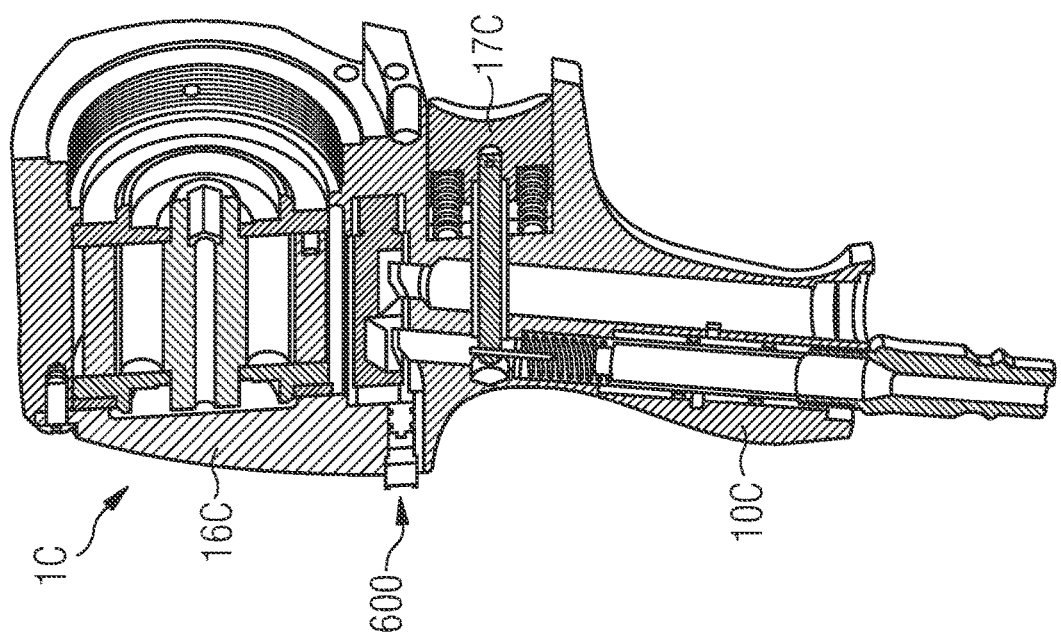
Figure 6C:
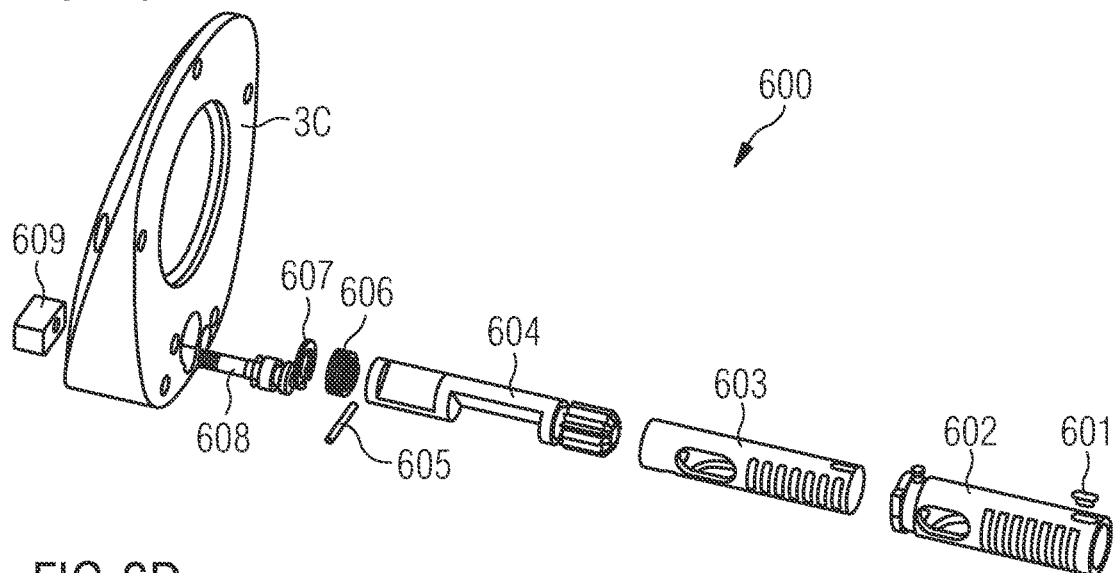
Figure 6D:
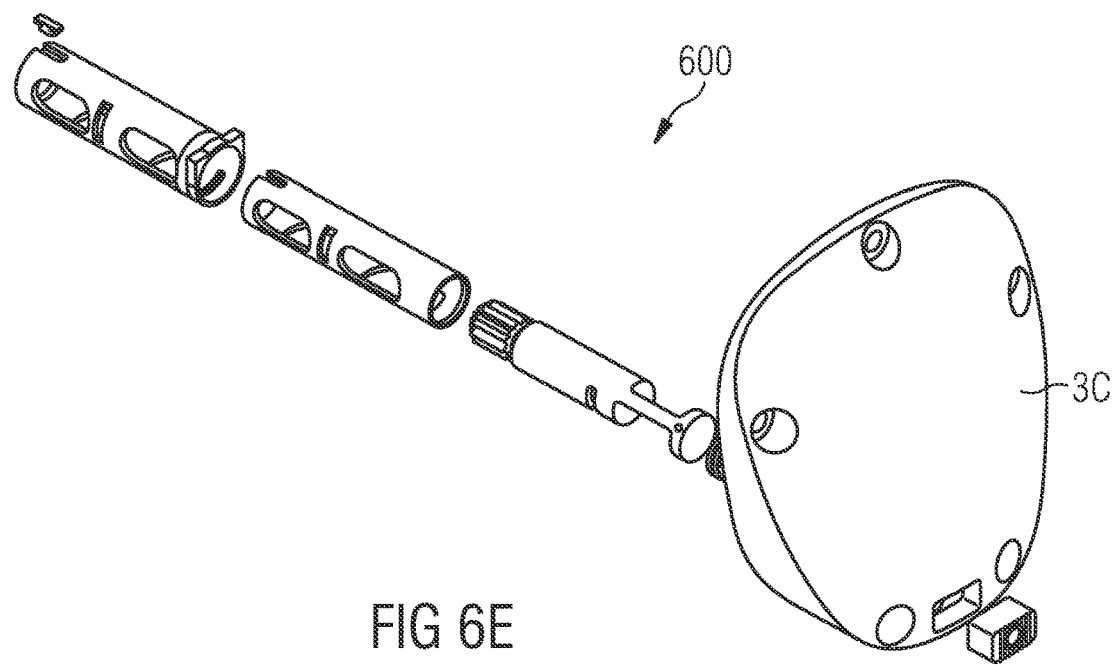
Figure 6E:
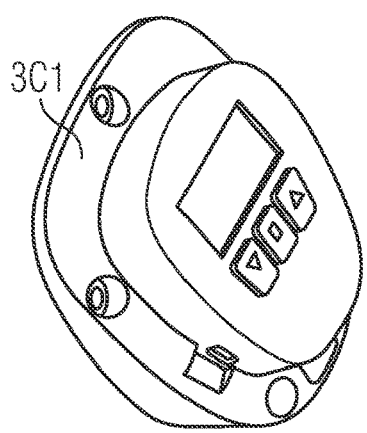
Figure 6F:
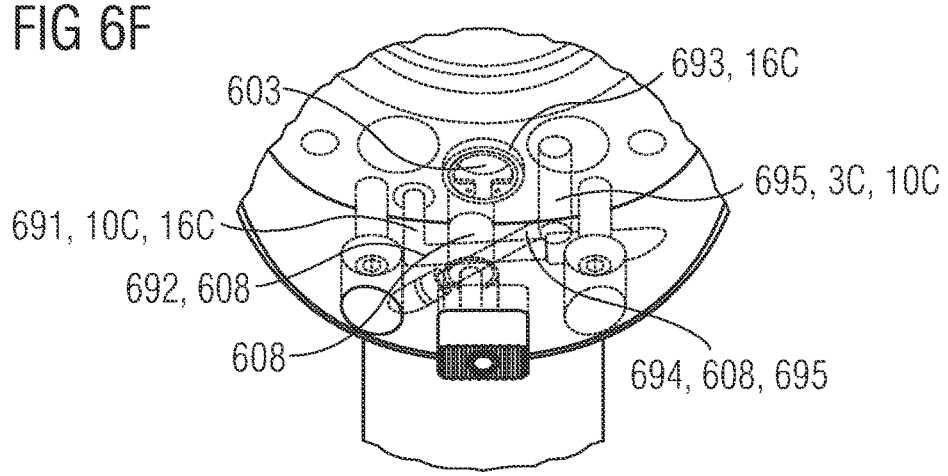
Figure 6G:
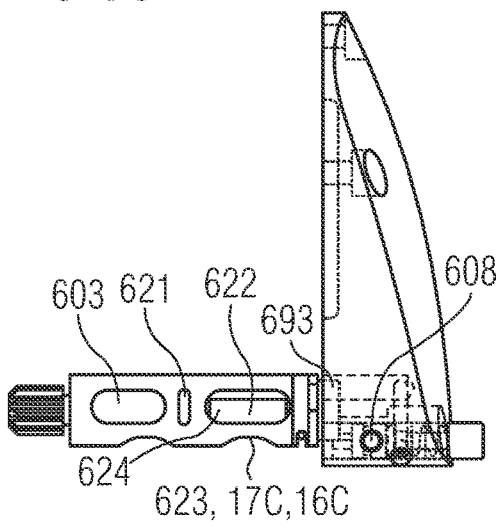
Figure 6H:
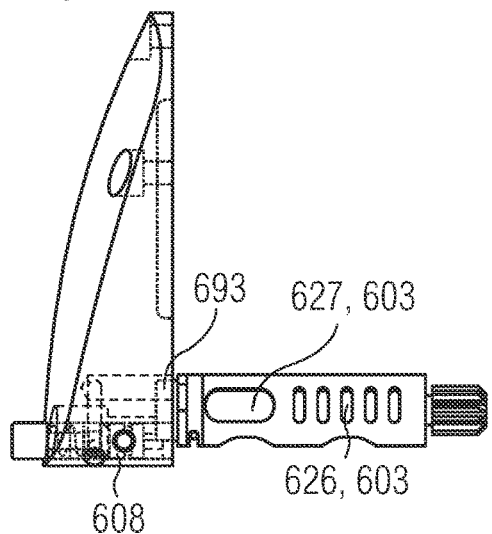
Figure 6I:
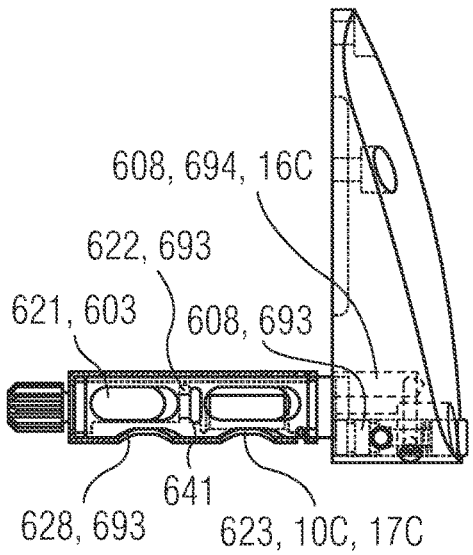
Figure 6J:
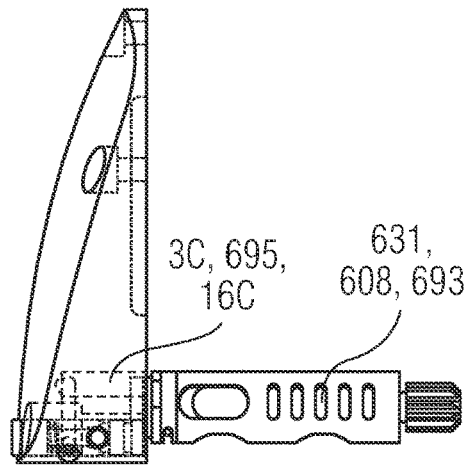
Figure 7A:
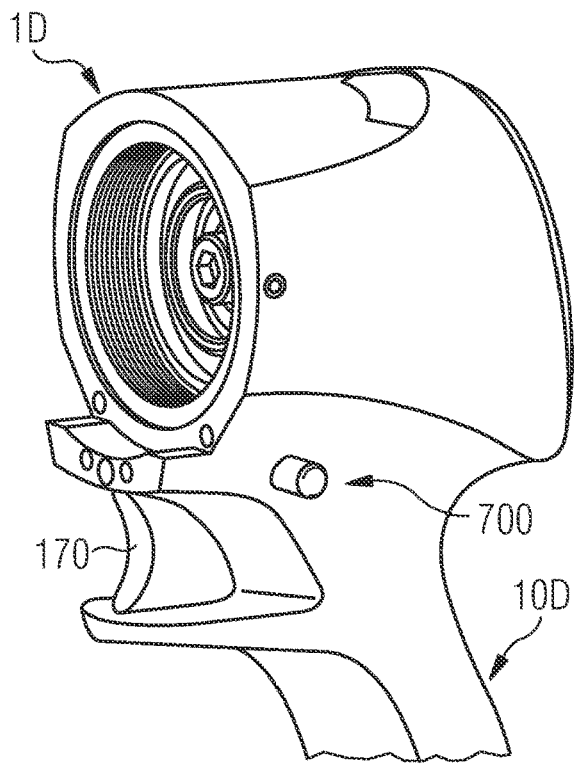
Figure 7B:
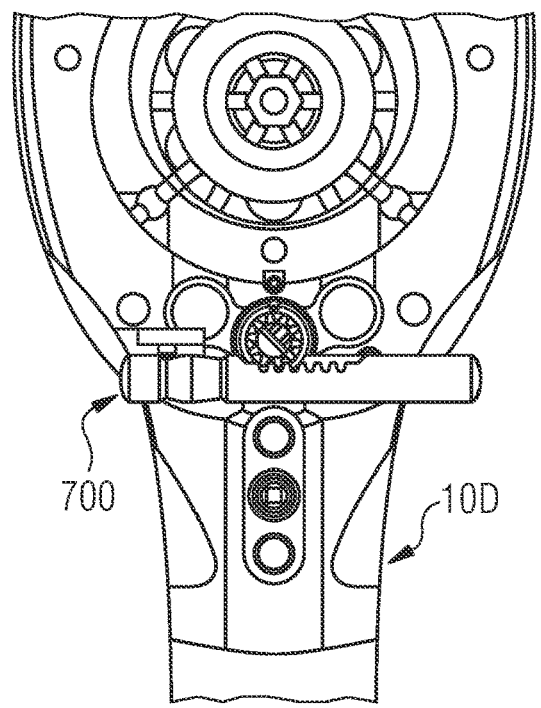
Figure 7C:
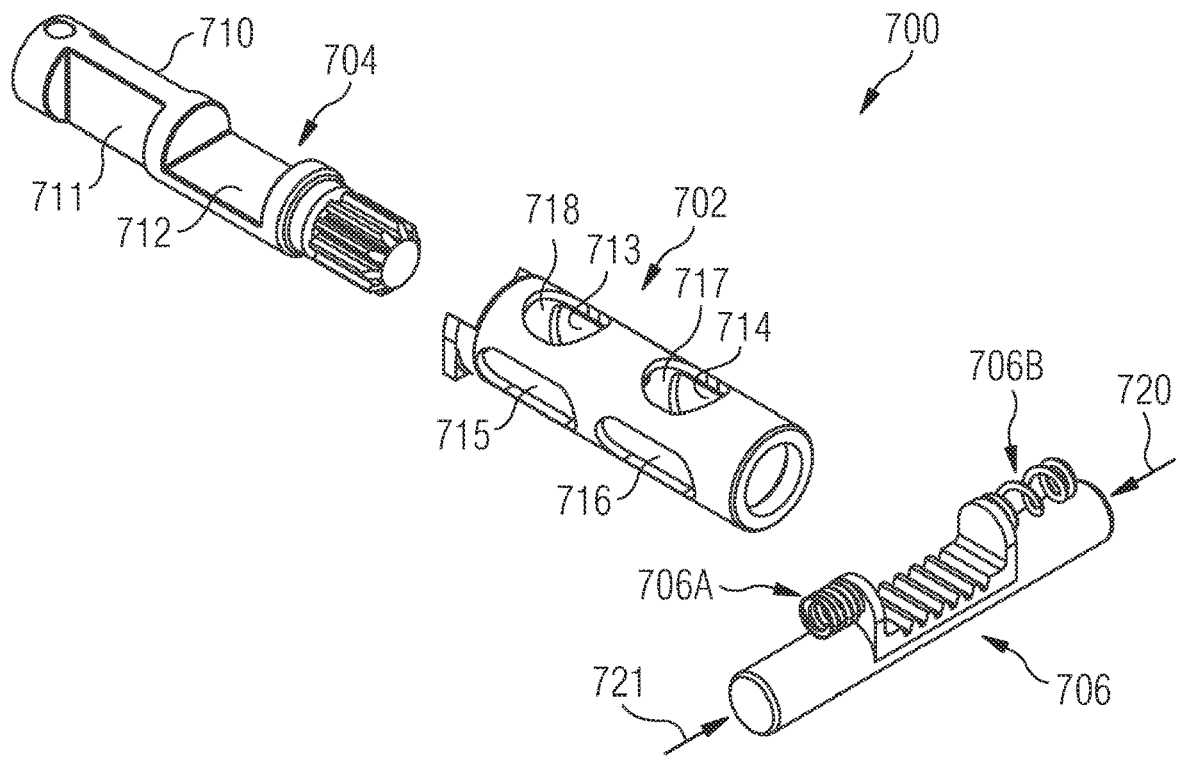
Figure 8A:
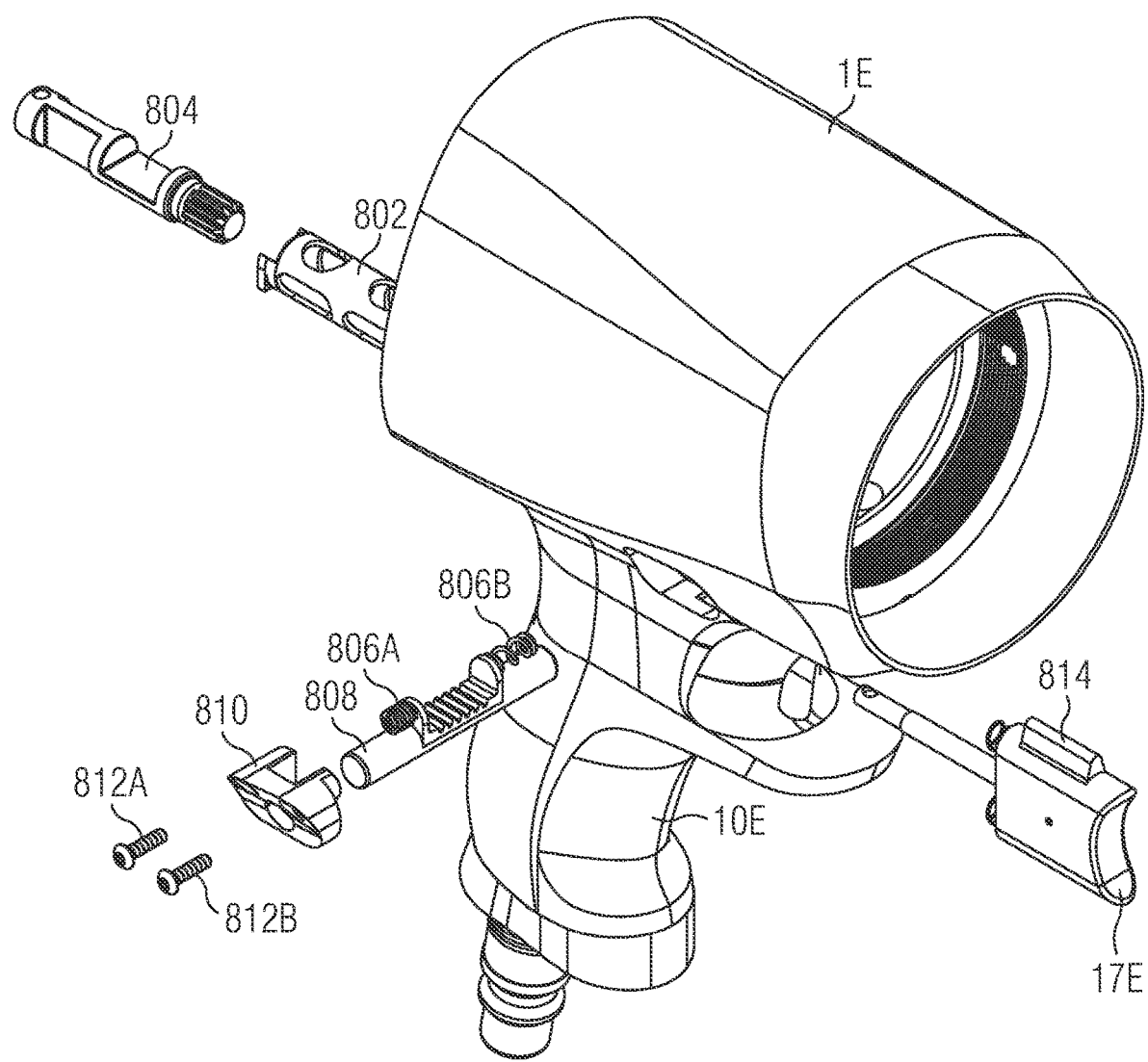
Figure 8B:
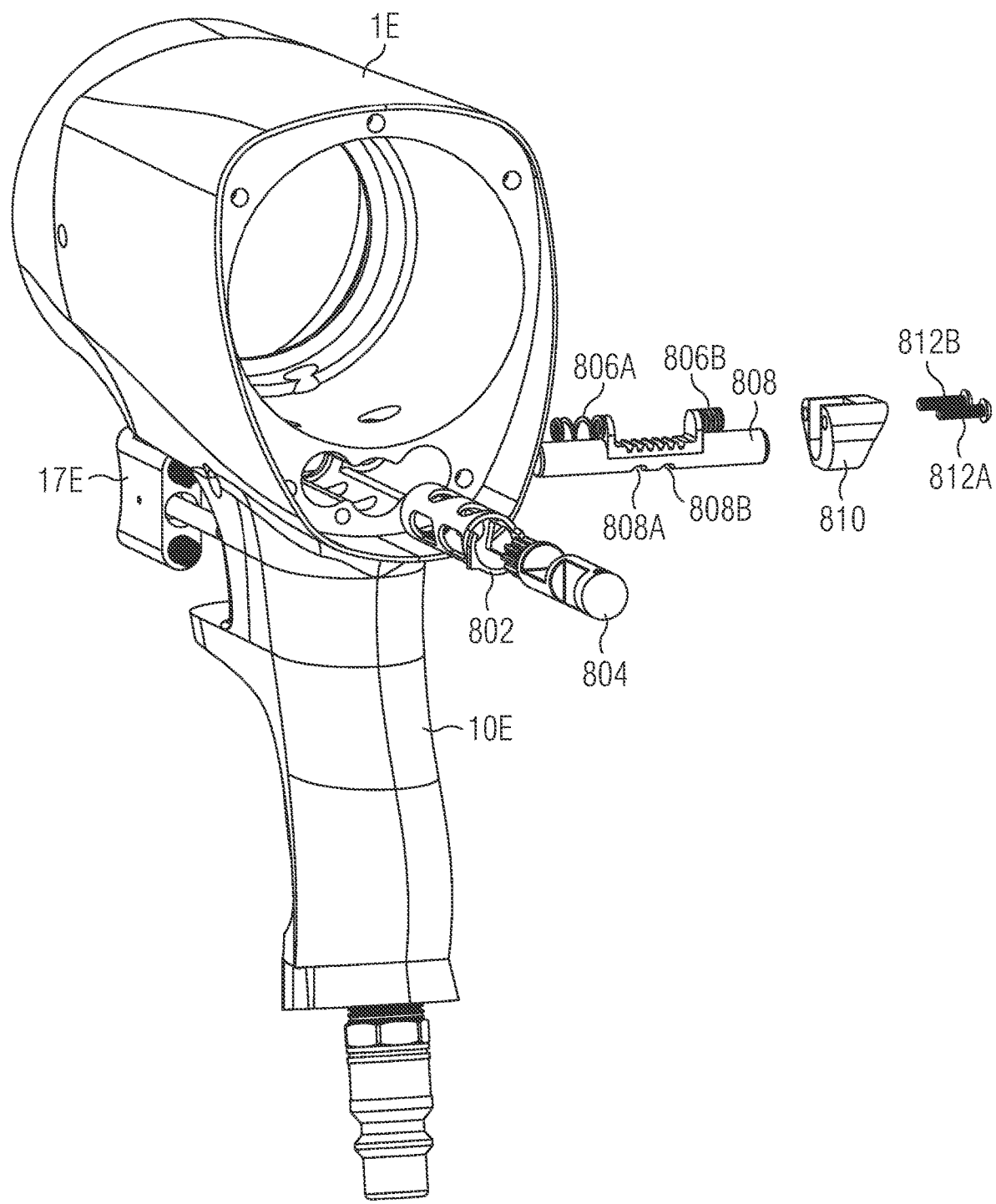
Figure 9A:
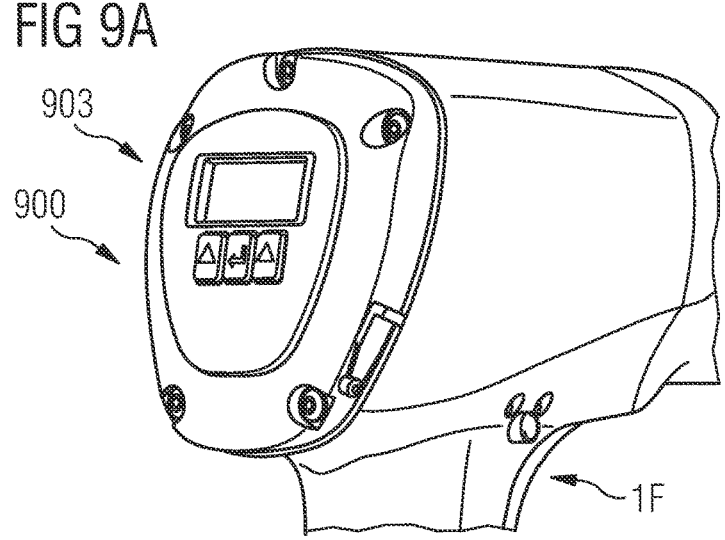
Figure 9B:
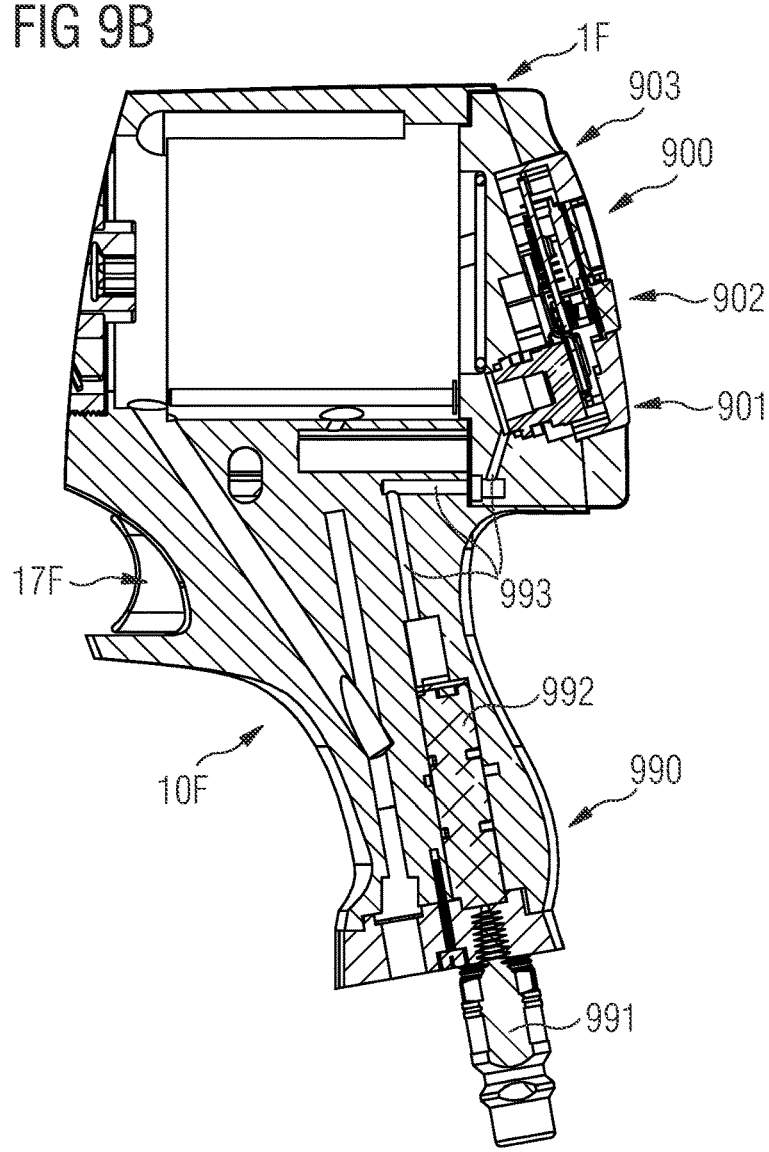

Disclosed inventions include:
integrated pneumatic flow pressure regulator assemblies with and/or without filters and/or swivels, per FIGS. 1A, 1B, 1C, 1D, 1E, 1F, 1G, 1H, 1I, 1J, 1K, 1L, 1M and 1N for use with all of Applicant's pneumatic torque gun models;
activation, or trigger, lock safety assemblies, per FIGS. 2A1, 2A2, 2B1 and 2B2, for use with all of Applicant's electric and pneumatic torque gun models;
automatic torque gun shifting assemblies including:
rotation speed-sensing centrifugal multi-speed automatic shifting assemblies, per FIGS. 3A, 3B and 3C, for use with all of Applicant's electric and pneumatic torque gun models;
torque-sensing centrifugal multi-speed automatic shifting assemblies, per FIGS. 4A, 4B, 4C, 4D, 4E, 4F, 4G, 4H, and 4I, for use with all of Applicant's electric and pneumatic torque gun models;
helical cam, or wobbling, turning force multiplication assemblies, per FIGS. 5A, 5B, 5C, 5D, 5E, 5F and 5G, for use with all of Applicant's electric and pneumatic torque gun models;
pneumatic pressure release, or burst, valve assemblies, per FIGS. 6A, 6B, 6C, 6D, 6E, 6F, 6G, 6H, 6I and 6J, that allow bleeding of pressure to unstick a locked up tool for use with all of Applicant's pneumatic torque gun models;
pneumatic fluid directional valve assemblies, per FIGS. 7A, 7B and 7C, for use with all of Applicant's pneumatic torque gun models;
pneumatic fluid directional and activation, or trigger, lock safety valve assemblies, per FIGS. 8A and 8B, for use with all of Applicant's pneumatic torque gun models; and
pneumatic tool cycle counter, or odometer, assemblies, per FIGS. 9A and 9B, that recognize tool actuations as drops in pneumatic pressure for use with all of Applicant's pneumatic torque gun models.

Figure 1A:
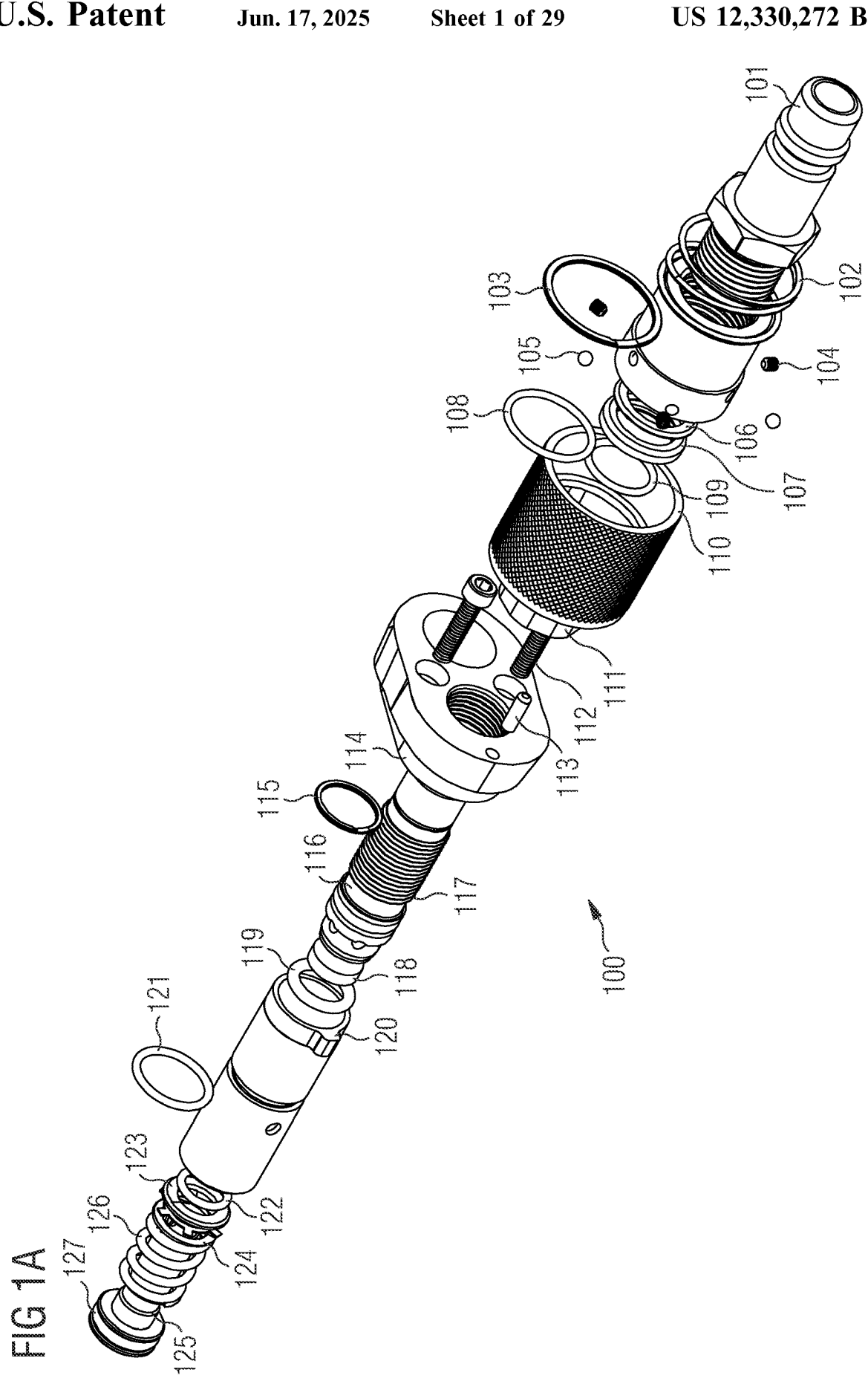
Figure 1B:
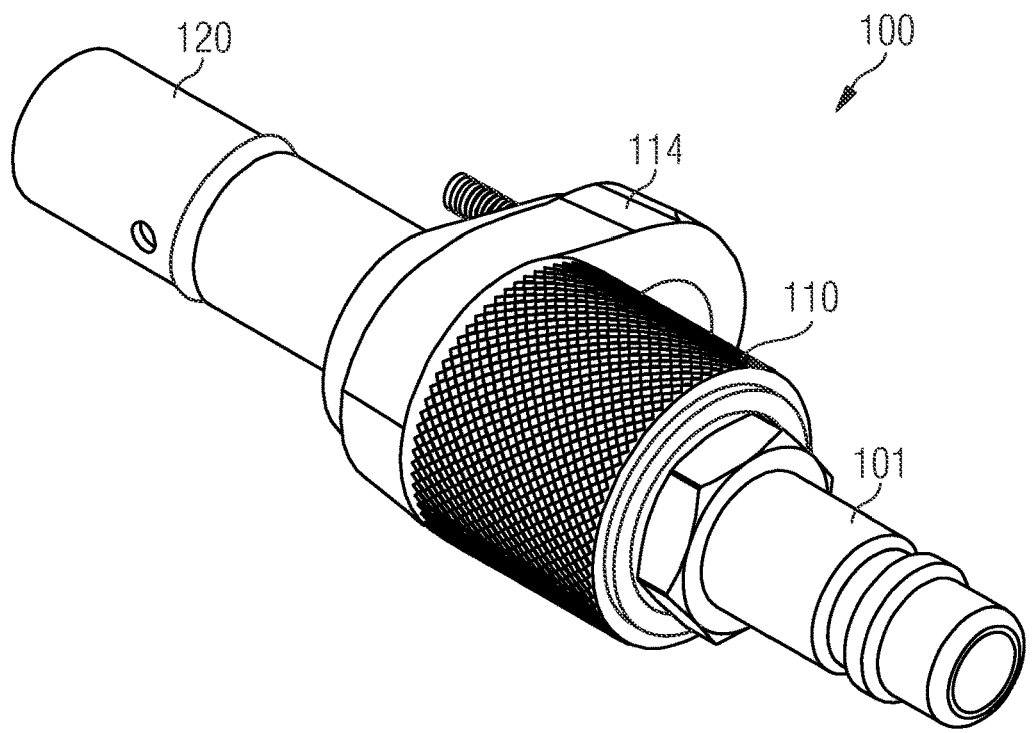
Figure 1C:
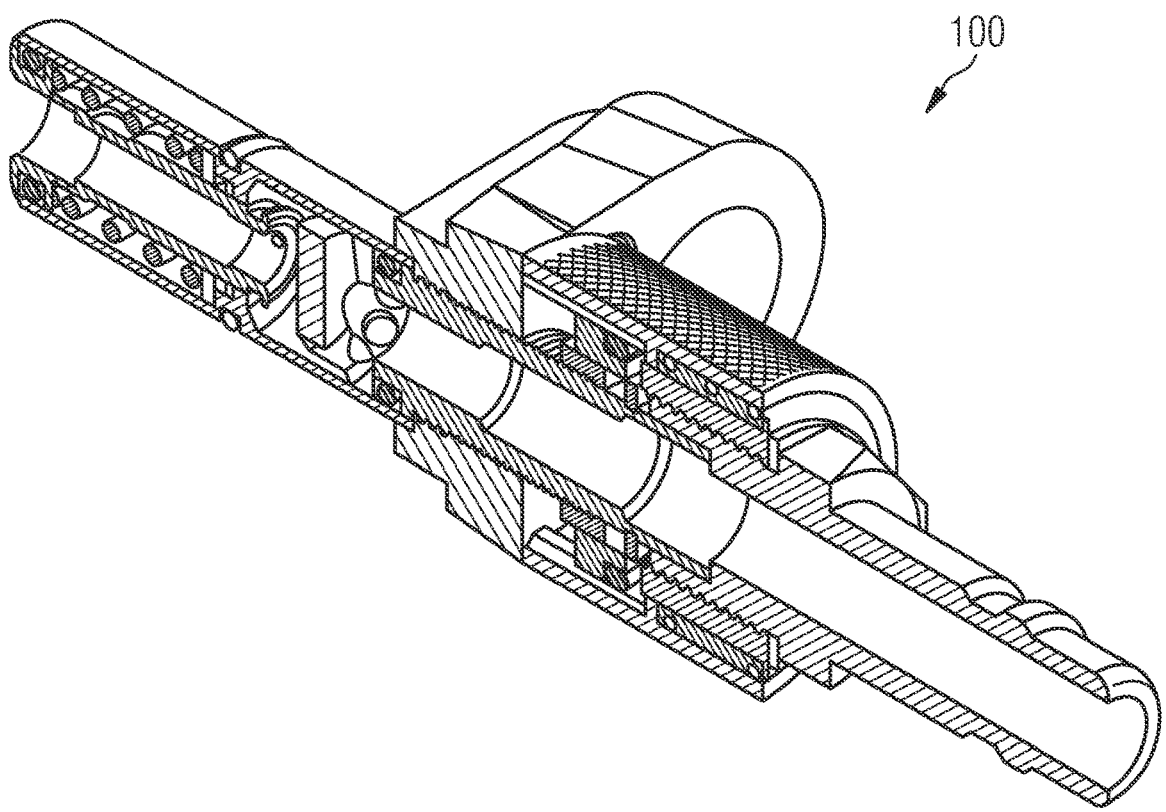

Integrated Pneumatic Flow Pressure Regulator Assemblies. Referring to FIG. 1A, by way of example, this shows an exploded perspective view of an integrated pneumatic flow pressure regulator assembly 100 for use with and formed as part of several of Applicant's pneumatic torque guns, including a torque gun 1 (not shown), for tightening and/or loosening of industrial threaded fasteners.

In this example, regulator assembly 100 includes: a pressure regulator inlet 101; a century spring 102; a lock ring 103; a set screw 104; ball bearings 105; an o-ring washer 106; a lock nut spacer 107; a lee spring 108; an o-ring 109; adjustment ring 110; an internal lock nut 111; socket head cap screws 112; a locking pin 113; a regulator cap 114; Smalley retaining ring 115; internal pressure relief valve 116; an internal pressure relief valve casing 117; a rubber disk 118; an o-ring 119; a valve housing 120; o-ring 121 and 122; a regulator valve spacer 123; a rotor clip 124; a piston 125; lee spring 126; and a retaining clip 127.

Fluid pressure is adjusted, for example, by rotating adjustment ring 110 of assembly 100. Internal pressure relief valve 116, similar to a venturi valve, prevents over-pressurization during bolting operations from potentially damaging torque gun 1. A display feature (not shown) is placed on the back of Applicant's torque guns to show actual torque output and/or regulated air pressure. Advantageously, regulator assembly 100: eliminates traditional stand-alone or in-series components of FRLs; and is integrated with, formed within, formed adjacent to and/or formed in-line with torque gun 1 and/or several other of Applicant's pneumatic torque guns.

Other features shown in FIG. 1 and installed within or adjacent in-handle pneumatic flow pressure regulator assembly 100 or handle 10 of torque gun 1 include: an exhaust noise muffler assembly 150 having a noise filter 151 (not shown) and a mesh screen 152 (not shown). An end cap 160 keeps all components within and/or adjacent handle 10 of torque gun 1. It is to be understood that there are numerous known types of components which may be used with in-handle pneumatic flow pressure regulator assembly 100.

Figure 1D:
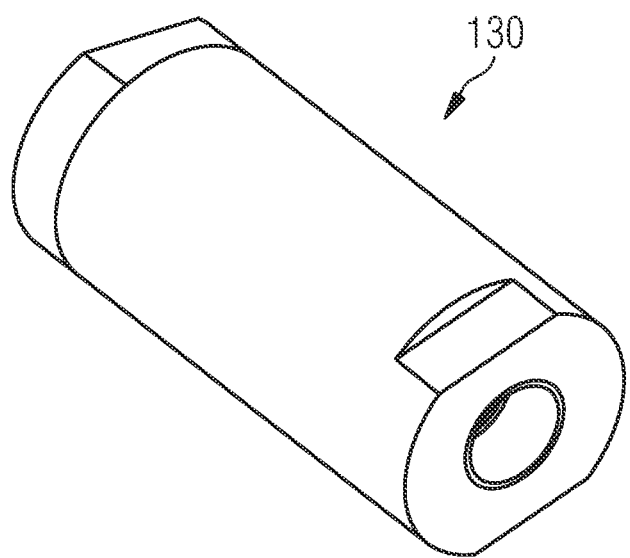
Figure 1E:
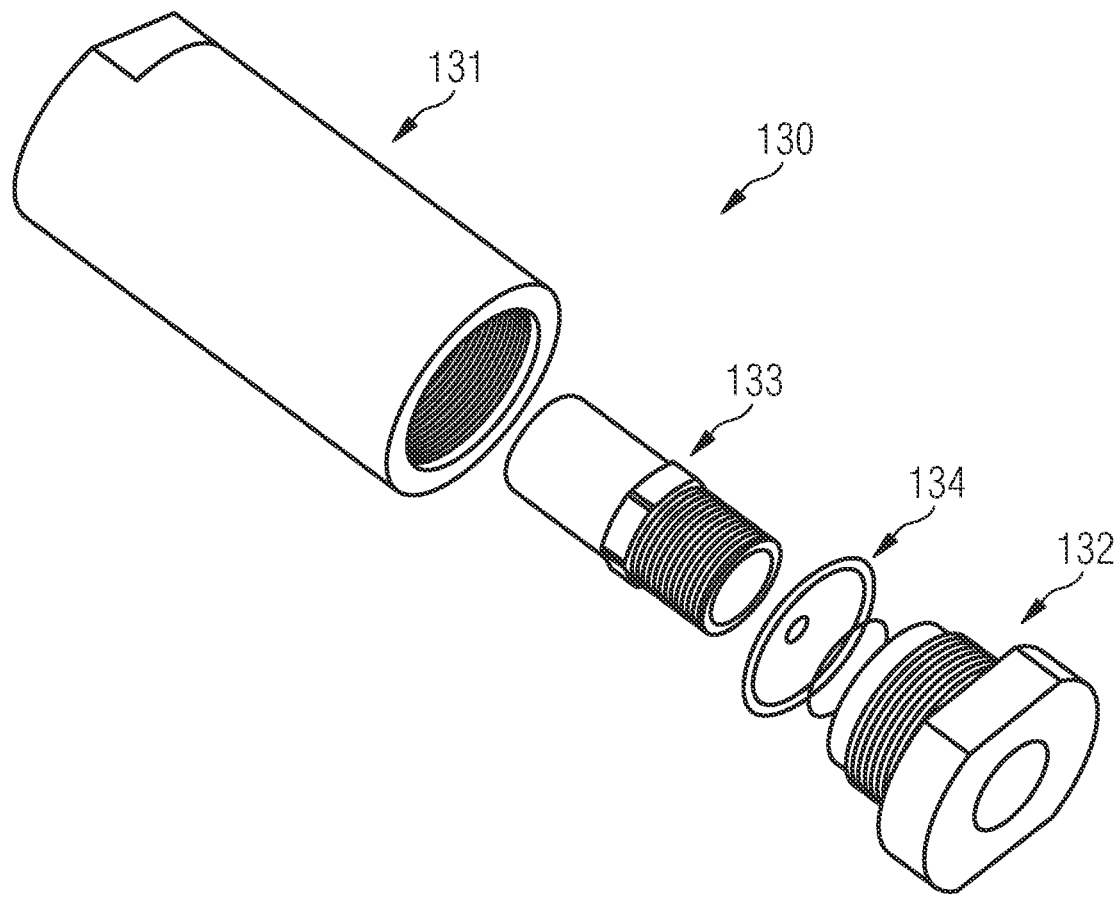
Figure 1F:
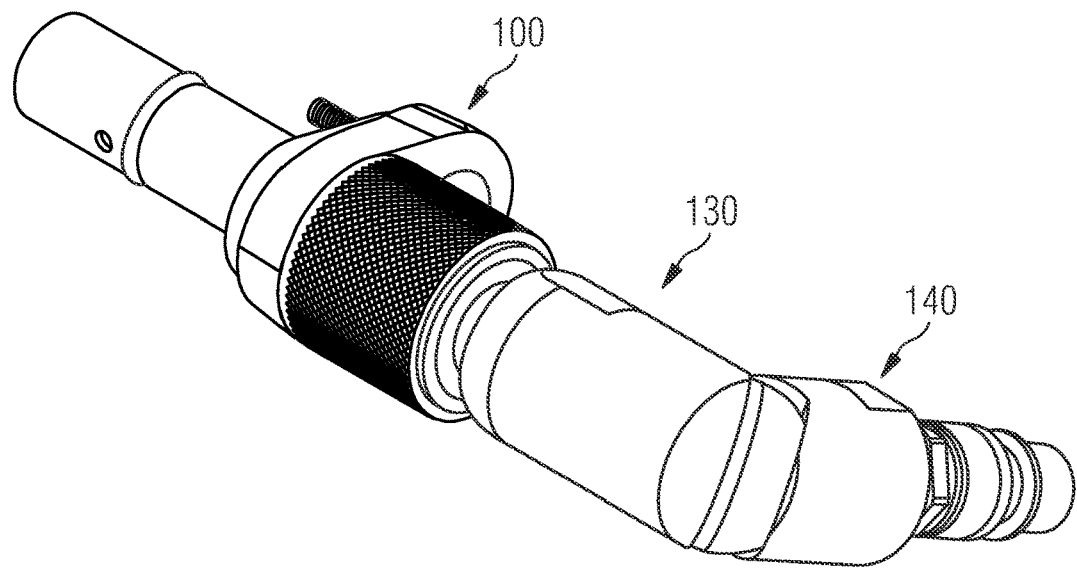

Furthermore, as shown in FIGS. 1D, 1E and 1F, by way of example, a filter assembly 130 may be formed within or adjacent in-handle pneumatic flow pressure regulator assembly 100 and/or handle 10 of torque gun 1. Filter assembly 130 includes a filtration unit 133 and an o-ring assembly 134 formed within a housing 131 which is closed by a cap 132. Filter assembly 130 filters, coalesces, adsorbs and/or dries compressed air by removing water, particulates and/or oil.

Additionally, as shown in FIG. 1F, by way of example, a swivel coupling assembly 140 may be formed adjacent in-handle pneumatic flow pressure regulator assembly 100, filter assembly 130 and/or handle 10 of torque gun 1.

Put another way, in-handle pneumatic flow pressure regulator assemblies of the present invention have a piston valve in a cylinder coactive with an adjustable spring-pressed diaphragm. The valve-diaphragm combination controls flow of fluid from an inlet passage through an outlet duct to turn a motor, such as, for example, a turbine motor, within torque gun 1. This serves to extend a venturi tube for subjecting valve-diaphragm combination to the pressure produced by fluid flow through the outlet duct. Such in-handle pneumatic flow pressure regulator assemblies have smaller dimension, greater capacity or outlet flow and less pressure drop in relation to known external regulators.

A locking ring is coaxially rotatable on a resilient flange on the casing. The locking ring coacts with the flange to lock and release an adjusting knob for the regulation of the spring pressure on the diaphragm. Such a design minimizes possibility of unintentional rotation of the knob from its adjusted position.

Figure 1G:
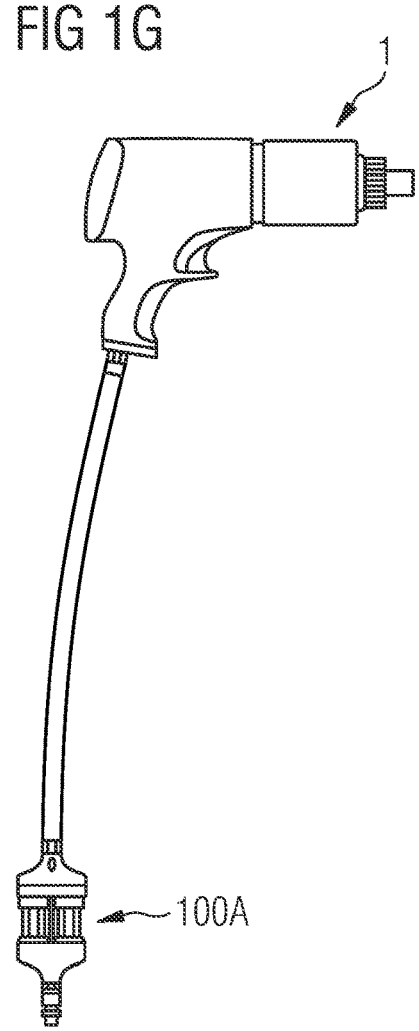
Figure 1H:
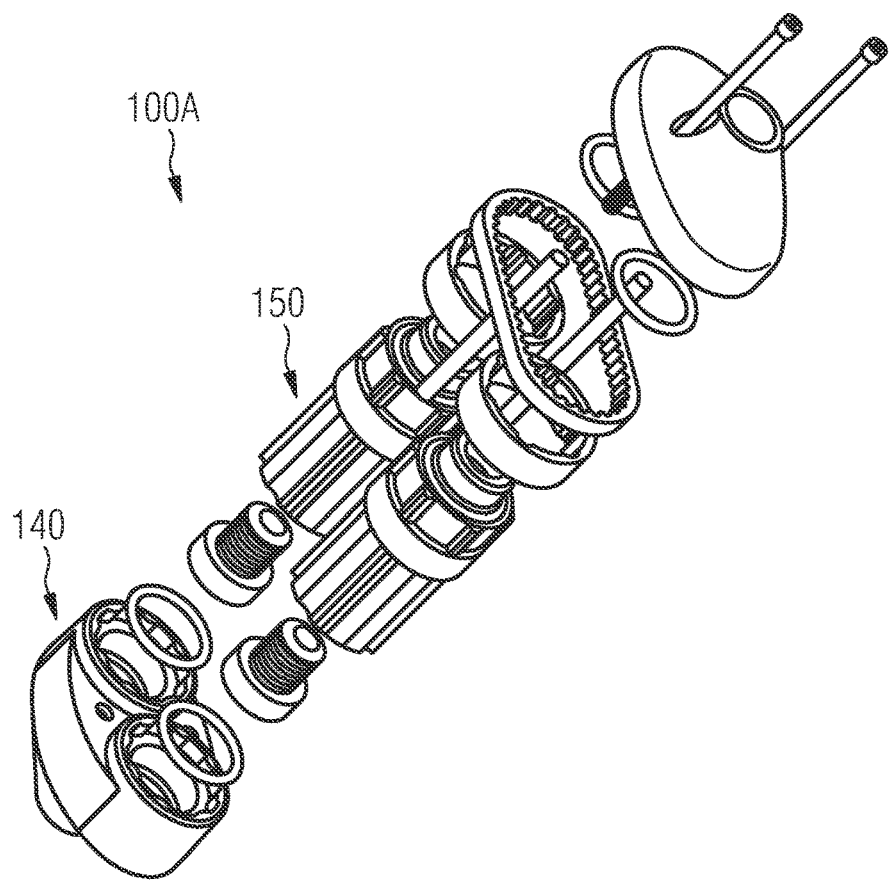
Figure 1I:
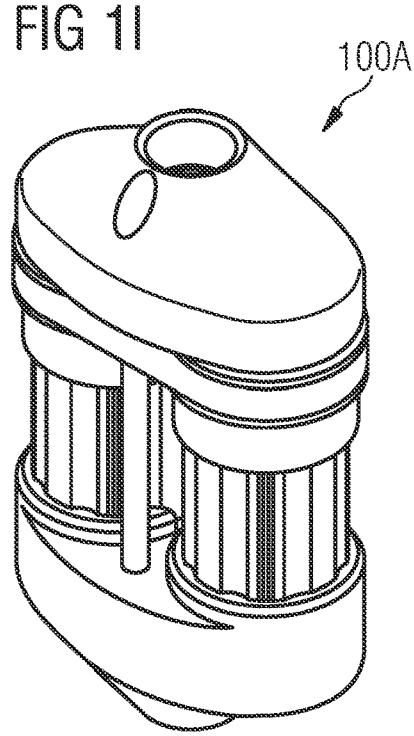
Figure 1J:
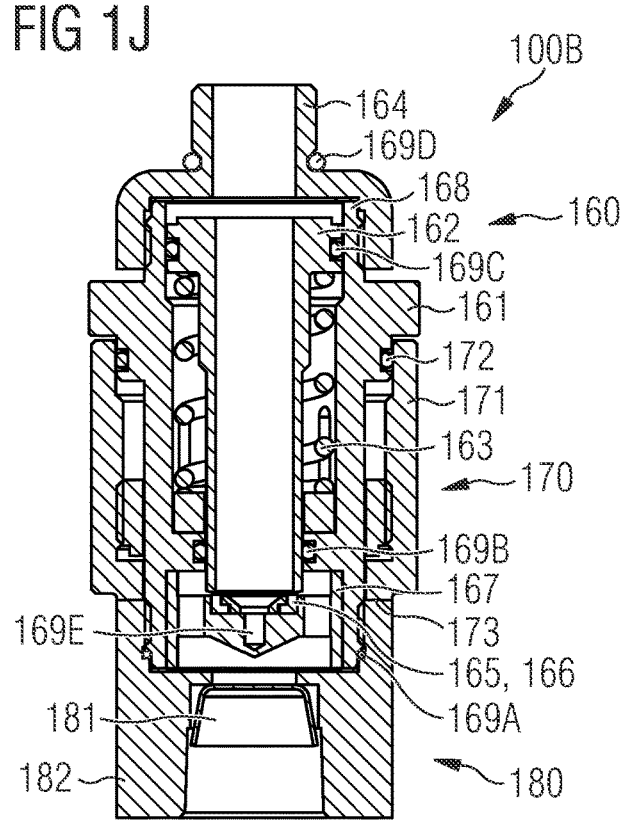

As shown in FIGS. 1G, 1H and 1I, by way of example, pneumatic flow pressure regulator assemblies of the present invention may include a plurality of regulator assemblies side by side. A regulator assembly 100A, as shown, is formed in-line, but not within handle 10 of tool 1. Alternatively, the plurality of regulator assemblies may be formed in tandem, either adjacent, within or without handle of tool 1.

FIGS. 1J, 1K, 1L, 1M and 1N, by way of example, show other embodiments of pneumatic flow pressure regulator assemblies of the present invention. Per FIGS. 1J, a pneumatic flow pressure regulator assembly 100B includes: a piston assembly 160; an adjustment assembly 170; and a filter assembly 180.

Piston assembly 160 includes: a valve housing 161; a piston 162; an helical spring 163; a regulator cap 164; a seal 165; a seal guide 166; a piston seat, or valve plate, 167; a gasket seal 168; o-rings 169A-D; and a screw 169E. Adjustment assembly 170 includes: a handle, or threaded collar, 171; a friction o-ring 172; and a washer 173. Filter assembly 180 includes: a filter 181; and a filter housing 182.

A pressurized fluid, such as compressed air, enters regulator inlet 101 of regulator assembly 100C and passes through filter 181 and a series of holes in valve plate 167. Filter 181 is secured in place using a press fit in filter housing 182. Seal 165 and washer 166 are secured to valve plate 167 and valve housing 161 with screw 169E.

When an un-balanced pressure state exists between the force exerted by spring 163 on regulator piston 162 and o-ring 169C and the inlet pressure, air passes through the holes in valve plate 167 if the inlet pressure is higher than the spring force on piston 162. Compressed air will continue to flow through regulator piston 162 through outlet port 164 until a balance between the inlet pressure and spring 163 is reached. A second unbalanced state can exist when the inlet pressure is less than the force exerted by spring 163 on regulator piston 162. In this case, pressurized fluid will bleed to the atmosphere until equilibrium is reached.

Spring 163 is adjusted using threaded collar 171 which is sealed by o-ring 169D against handle 10 of tool 1 until a balanced state is attained. Fluid pressure is controlled by increasing or decreasing the force on spring 163 by rotating the threaded collar 171. Several o-rings 169B, 169C and 172 seal regulator assembly 100B create negligible fluid leakage. A gasket 168 is formed between the outlet port of valve housing 161 and cap 164. Threaded cap 164 connects regulator assembly 100B to handle 10.

Representative design parameters related to regulator assembly 100B, by way of example, include the following. Generally, regulator assembly 100B is intended to meet or exceed flow characteristics of regulators of the prior art, such as, for example, an AW30 regulator from SMC Corporation of America. Specifically, compressed air is the intended pressurized fluid media and includes water vapor, lubricants and miscellaneous particulate. Filter 181 is positioned at the inlet port to remove water vapor, lubricants and miscellaneous particulate of greater than 2, 10, 20, 40, 70 or 100 microns. Inlet fluid pressure is intended to be 105 to 140 psig and outlet fluid pressure is intended to be adjustable between 20 to 100 psig. Flow rate may be 50 SCFM at 20 to 90 psig outlet with 105 to 140 psig inlet. Zero internal fluid leakage is intended with a tight shutoff to maintain downstream setpoint, i.e. air bleed directly to exhaust port of torque gun acceptable, if necessary. Other design parameters include: 20 to 120° F. ambient temperature; 3/8 NPT ports; wetted materials such as brass, CRES, Nitrile/Buna N; 1.25 OD max envelope; field serviceability and/or repair; easy and accurate achievement of setpoint through coarse/fine pressure adjustment; greater than 20 k cycle lifetime; etc.

Figure 1K:
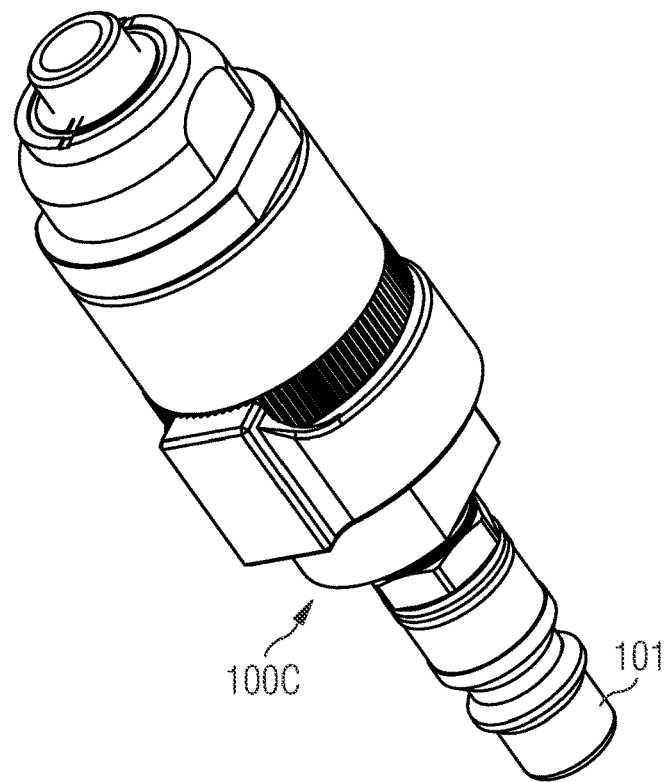

FIGS. 1K and 1L, by way of example, show a pneumatic flow pressure regulator assembly 100C, which includes: piston assembly 160; adjustment assembly 170; filter assembly 180; and a locking assembly 190. Locking assembly 190 includes: a lock collar 191 having an upper spline engagement 191A; a lower spline engagement formed on threaded collar 161; a shoulder screw 193; and a ball plunger 194. External locking assembly 190 minimizes possibility of unintentional rotation of threaded collar 161 from its adjusted position during operation of tool 1. Splines 191A engage splines 192 and lock collar 191 is held in place axially by ball plunger 194 which allows lock collar 191 to move from an adjustment position to a lock position. Lock collar 191 is constrained rotationally by shoulder screw 193, which permits lock collar 191 to slide axially along a slot but fixed rotationally.

Figure 1M:
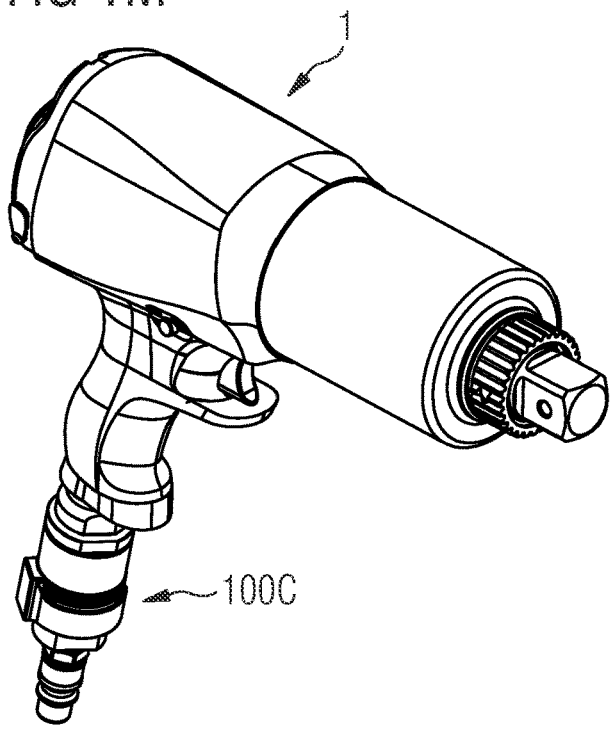
Figure 1N:
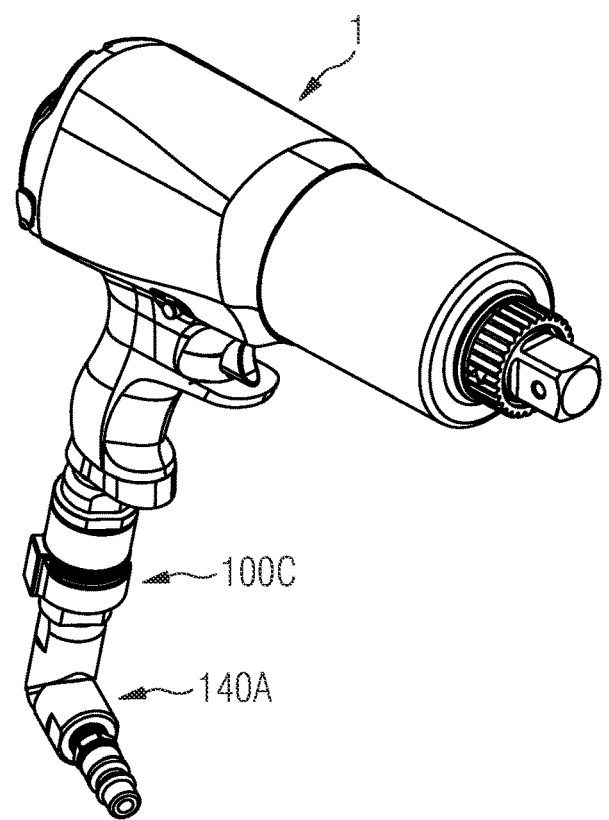

FIGS. 1M and 1N show regulator assembly 100C, with and without a swivel coupling assembly 140A, formed adjacent to handle 10 of tool 1.

It is to be understood that there are numerous known types of components which may be used with integrated pneumatic flow pressure regulator assemblies of the present invention, like 100, 100A, 100B and 100C.

Activation, or Trigger, Lock Safety Assemblies. Applicant places utmost priority on maintaining bolting industry safety standards and seeking ways to increase bolting safety. FIGS. 2A1, 2A2, 2B1 and 2B2, by way of example, show perspective views of portions of torque guns 1A and 1B having activation, or trigger, lock safety assemblies 200 and 250, respectively. Safety assemblies 200 and 250 are shown for use with Applicant's pneumatic torque gun models, but can be modified for use with Applicant's electric torque gun models as well.

Trigger lock safety assembly 200 is formed within and/or adjacent a modified handle 10A near the back of tool 1A having a modified trigger 17A. In this example, safety assembly 200 includes: a push button 202; a retaining button 201; a lock rod 203; and a retaining spring 204. A user must depress push button 202 before pneumatic fluid or electricity is available to operate torque gun 1A. Safety assembly 200 prevents accidental actuation of torque gun 1A which could result in serious injury to the user. Both hands of the operator must be located on tool 1A—one on trigger 17A and one on push button 201.

Trigger lock safety assembly 200 locks trigger 17A from being depressed by means of a groove in lock rod 203, which is threaded in to trigger 17A. This groove in lock rod 203 is occupied by the cylindrical portion of push button 202, which is captured in a hole perpendicular to the centerline of lock rod 203, and by retaining button 201, which is threaded into handle 10A. Push button 202 is spring loaded by retaining spring 204 and has a circular groove adjacent to the cylindrical portion that is positioned in the retaining groove of lock rod 203. To release locked trigger 17A, push button 202 is depressed, moving the position of the groove in push button 202 into direct alignment with lock rod 203 thereby allowing lock rod 203 to move rearward. After trigger 17A is released, lock rod 203 returns to its original position allowing retaining button 201 to move back to lock position via preload from retaining spring 204.

In other words, trigger 17A is locked from being depressed by means of the cylindrical portion of push button 202 being aligned with the groove in lock rod 203. And, conversely, trigger 17A is allowed to be depressed by means of the cylindrical portion of push button 202 being misaligned with the groove in lock rod 203.

Trigger lock safety assembly 250 is formed within and/or adjacent a modified handle 10B substantially between a trigger 17B and the back of torque gun 1B. In this example, safety assembly 250 includes: a lever arm 251; a lock pin 252; a lock tumbler 253; a lever housing 254; a lever tumbler 255; a torsion spring 256; a trigger pin 257; a trigger spring 258; a lever screw 259; a set screw 260; and a cap 261. Safety assembly 250 is shown positioned such that lever arm 251 is accessed by an operator's left hand. A second version of trigger lock safety mechanism 250 (not shown) includes similar components but positioned such that lever arm 251 is accessed by an operator's right hand. A user must rotate lever arm 251 before pneumatic fluid or electricity is available to operate torque gun 1B. Safety assembly 250 prevents accidental actuation of torque gun 1B which could result in serious injury to the user. Both hands of the operator must be located on tool 1B—one on trigger 17B and one on lever arm 251.

Trigger 17B is locked in position via trigger pin 250 which is threaded into trigger 17B. Trigger 17B is spring loaded via trigger spring 258 which is seated in trigger pin 257. Trigger pin 250 has a radius groove at the end. Lock pin 252 is keyed into this groove, preventing reward movement of trigger pin 257.

To unlock trigger 17B, lock pin 257 has a relief groove perpendicular to the centerline of lock pin 252, and keyways at both ends. The relief groove is cut at a specific angle to both keyways at each end such that when lock pin 252 is rotated at that specific angle, the relief groove lines up with the centerline of trigger pin 250 allowing rearward movement. Lock pin 252 is rotated via a gear set consisting of lock tumbler 253, keyed to lock pin 252 at the end, and lever tumbler 255. Lever tumbler 255 and lock tumbler 253 are retained in handle 10B via lever housing 254 which is seated in a pocket in modified handle 10B and retained with a screw 260. Lever tumbler 255 is rotated via lever arm 251 which is keyed to lever tumbler 255 and retained with lever screw 259 and is also spring loaded via a torsion spring 256. As lever arm 251 is rotated up (counter clockwise), this in turn rotates lever tumbler 255 which rotates lock tumbler 253 (clockwise), thus rotating lock pin 252. The throw of the system is limited by a pin 262 in lock tumbler 253. Pin 262 rides in a machined groove of specific angular distance, in lever housing 254, as to limit the angular deflection of lock pin 253. The extreme limit of the counterclockwise movement of lever arm 251 positions the relief groove in lock pin 251 in alignment with the centerline of trigger pin 257, allowing free movement rearward. Upon release of trigger 17B, trigger spring 258 pushes trigger pin 257 forward to its original position, with the radius groove directly in line with lock pin 252. Torsion spring 256 forces the now, free to move lever tumbler 255 to rotate clockwise, turning lock tumbler 253 and subsequently lock pin 252 counter clockwise by rotating the relief groove in lock pin 252 out of the path of trigger pin 257, thus relocking it.

In other words, trigger 17B is locked from being depressed by means of rotation of lever arm 251 to charge torsion spring 256. And, conversely, trigger 17B is allowed to be depressed by means of release of lever arm 251 to discharge torsion spring 256.

In other embodiments not shown, buttons, levers and/or rods are located on both sides of the tool thereby requiring specific hand placements prior to operation. Once the trigger is pulled the user can release the safety lever and as long as the trigger remains pulled the tool will remain energized. When the user releases the trigger the lock is reengaged automatically. That way every time the trigger is pulled the button and/or safety lever first needs to be disengaged. In one embodiment, the trigger lock is an obstruction on a flat portion on the trigger rod preventing the trigger from being pulled without disengaging the safety.

It is to be understood that there are numerous known types of components which may be used with trigger lock safety assemblies of the present invention, like 200 and 250.

Automatic Torque Gun Shifting Assemblies. Applicant places utmost priority on maintaining bolting industry safety standards and seeking ways to increase bolting safety. Use of an automatic clutch mechanism with high speed and high torque bolting applications poses safety concerns. For example, operators risk severe injury due to pinch points between reaction arms of Applicant's torque guns and the reaction surfaces when such tools shift between run-down and high-torque modes. Indeed abrupt changes between modes are dangerous to operators. In high-speed mode, reaction torque of Applicant's torque gun models range from minimal to nonexistent. Nonetheless, the reaction arm may spin in a dangerous fashion. Conversely, in low-speed mode, reaction torque of Applicant's torque gun models is extremely high requiring use of reaction arms.

Applicant further invented multi-speed automatic shifting assemblies to automatically switch its two (or more) speed torque guns between a high speed/low torque ("HSLT") mode, a low speed/high torque ("LSHT") mode and vice versa. Advantageously shifting assemblies of the present invention automatically shift Applicant's torque guns between fastener run-down or run-up functions, with speeds as high as 4,000 rpms, and fastener tightening or loosening torque functions, with speeds as high as 150 rpms to as low as 4 rpms. A sensing mechanism determines when it is appropriate to shift between modes.

Applicant viewed its Z® System, and specifically the Z® Gun, as a good candidate for testing of such a multi-speed automatic shifting assembly because there is no external reaction fixture. Note, however, that automatic shifting assemblies of the present invention may be used with all of Applicant's torque guns. Trigger lock safety assemblies previously and subsequently described may be used to decrease risk of operator injury during operation.

Rotation speed-sensing centrifugal multi-speed automatic shifting assemblies. FIGS. 3A, 3B and 3C, by way of example, show an embodiment of a rotation speed-sensing centrifugal multi-speed automatic mode shifting assembly 300 of the present invention for use with electrically or pneumatically operated torque guns. Assembly 300 may include: an outer LSHT clutch plate pack 301; an inner HSLT clutch plate pack 302; an outer pack spring 303; an assembly housing 304; ball bearings 305; a clutch spider plate 306; a high speed pressure plate 307; retracting pressure plate 308; a throwout bearing 309; and bearings 310 and 311.

Assembly 300 operates on the premise that speed and torque are inversely related in the tool, i.e. high speed implies low torque and low speed implies high torque. Assembly 300 is formed substantially within a housing 304 and operates as follows. Outer LSHT clutch plate pack 301 is locked by default by outer pack spring 303 for running in LSHT mode. Outer pack spring 303 locks an independent ring gear 322A for a first and a second planetary gear stage 322 and 323 to housing 304, which allows the tool to run in LSHT mode.

When a motor 330 hits a predetermined speed, ball bearings 305 adjacent clutch spider plate 306 on both sides are forced out due to centrifugal forces from turning forces 332 and 333 of motor 330. These centrifugal forces force high speed pressure plate 307 against inner HSLT clutch plate pack 302 simultaneously pushing retracting pressure plate 308 against outer pack spring 303 via throwout bearing 309. Such action at HSLT results in outer pack spring 303 to become released, allowing independent ring gear 322A to spin freely on bearings 310 and 311 that support it. At the same time, inner HSLT clutch pack 302 locks a motor drive shaft 331 directly to independent ring gear 322A, essentially bypassing first and second stages 322 and 323 and driving a third stage 324 directly from motor 330.

When motor 330 slows down due to increased resistance of a nut or bolthead being seated, ball bearings 305 in spider plate 306 retract bringing both inner and outer clutch plate packs 301 and 302 back to their respective default states. Indeed, rotation speed-sensing centrifugal multi-speed automatic mode shifting assembly 300 constantly shifts between a five (5) stage gear box 320A and a three (3) stage gear box 320B of gear box assembly 320 within a housing 321 at approximately 4000 rpm of air motor 330.

Figure 4A:
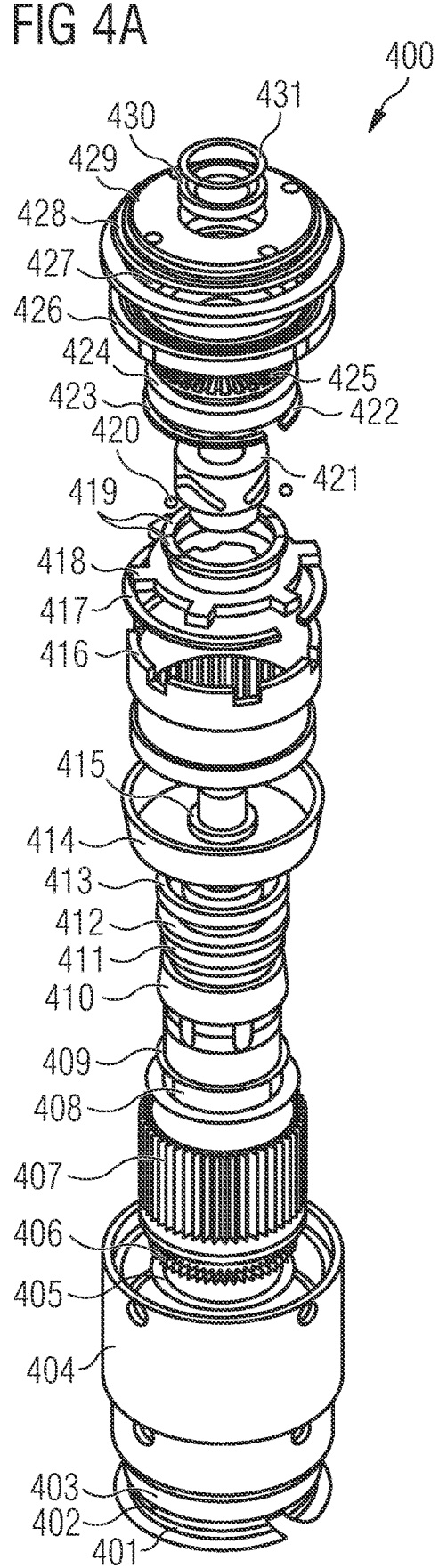
Figure 4B:
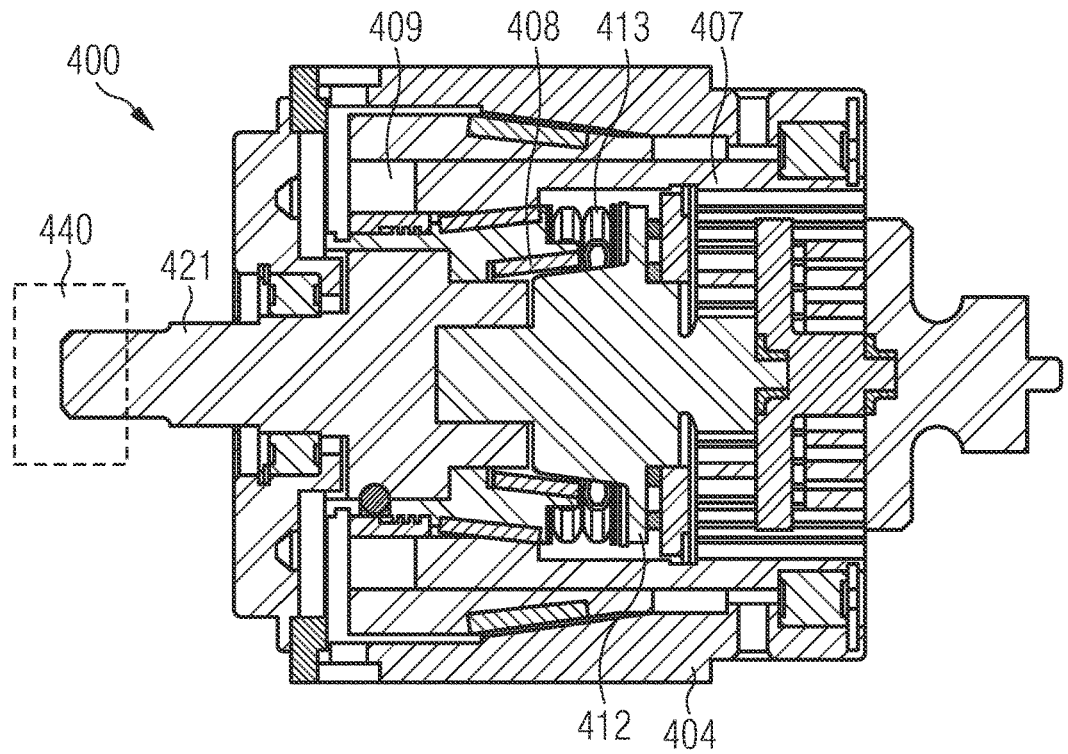
Figure 4C:
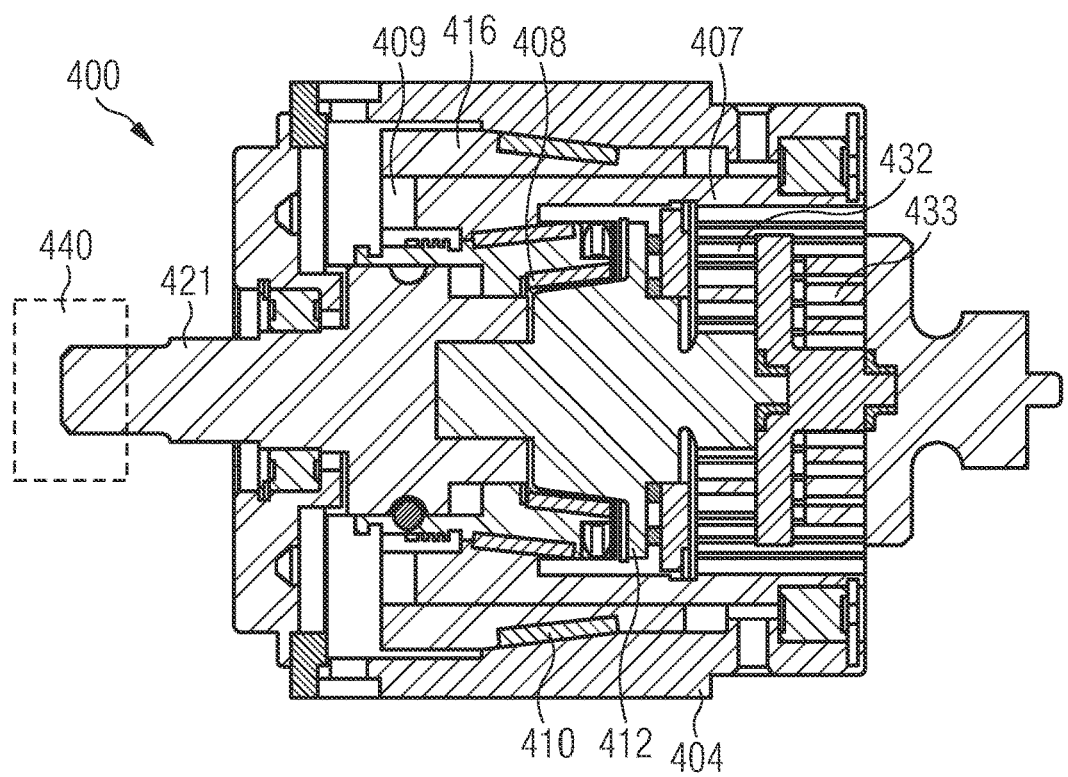

Torque-sensing centrifugal multi-speed automatic shifting assemblies. FIG. 4A, by way of example, shows an exploded perspective view of an embodiment of a torque-sensing centrifugal multi-speed automatic shifting assembly 400 of the present invention for use with Applicant's electrically or pneumatically operated torque guns. Assembly 400 has elements that physically displace as a function of torque and this displacement is used to shift a gear ratio changing mechanism. FIG. 4B shows assembly 400 in HSLT mode. And FIG. 4C shows assembly 400 in LSHT mode.

Torque-sensing centrifugal multi-speed automatic shifting assembly 400 may include: Smalley retaining rings 401, 402, 405, 417, 423, 424 and 431; a bearing 403; a main housing 404; a lower thrust washer 406; a first and a second gear stage housing, or ring gear, 407; inner friction materials 408; inner friction hub 409; outer friction materials 410; iGlide® bearings 411 and 415; a first gear stage sun, or low speed drive, 412; Smalley wave spring 413; an external clutch material 414; external clutch housing 416; an inner retaining ring 418; a Smalley external wave ring 419; ball bearings 420; helical cam input shaft 421; thrust needle-roller bearing 422 and 425; a top main housing 426; a thrust needle-roller washer 427; a bearing spacer 428; a bearing connector 429; and a bearing 430.

General operation of torque-sensing centrifugal multi-speed automatic shifting assembly 400 powered by a motor 440 is as follows. In HSLT mode, helical cam shaft 421 is forced into a neutral position by a Smalley wave spring 413. Inner friction materials 408 are forced to engage between a gear ring, or a first and a second gear stage housing 407 and an inner friction hub 409. This eliminates rotation of a low speed drive 412. In this example, gear ring 407 rotates and produces a final high speed output ratio of approximately 67:1, as opposed to the low speed ratio of approximately 1291:1.

In LSHT mode, helical cam shaft 421 forces inner hub 409 and an outer clutch housing 416 to engage through outer friction materials 410. These components engage with main housing 404 and low speed drive 412 which activates a first and a second planetary gear stage 432 and 433. In this example, a gear reduction ratio of approximately 19:1 is achieved.

Figure 4D:
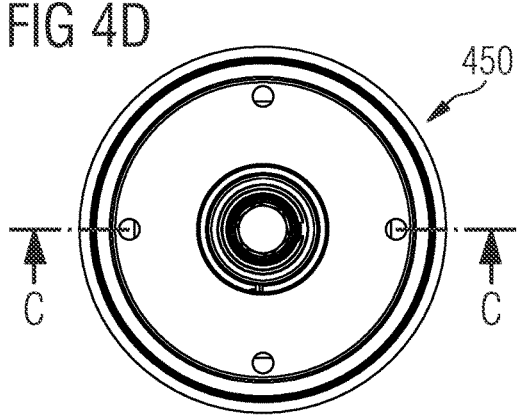
Figure 4G:
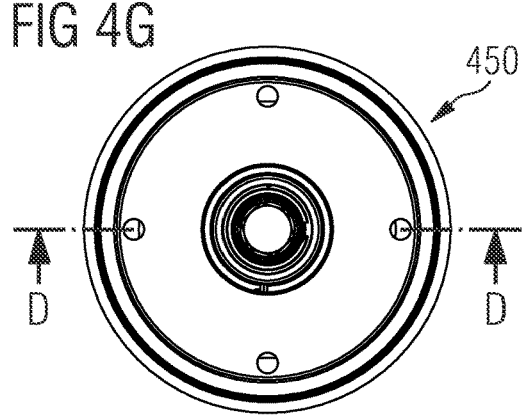
Figure 4E:
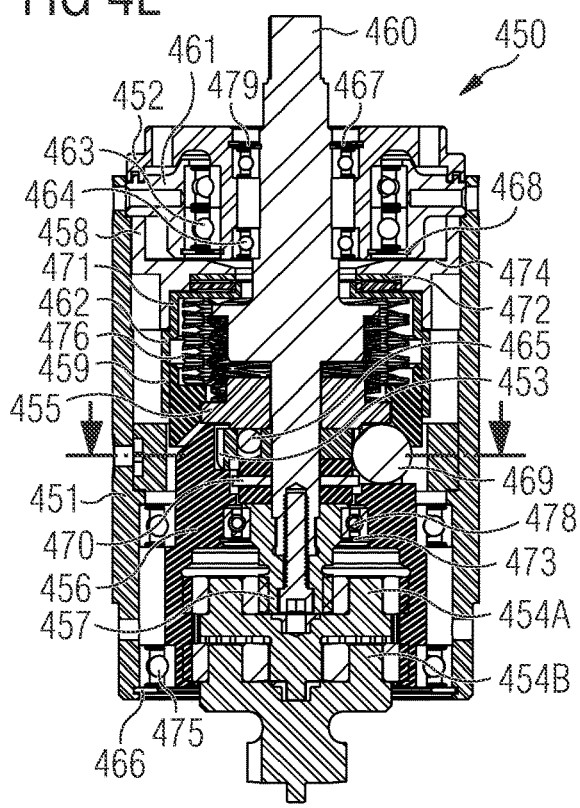
Figure 4H:
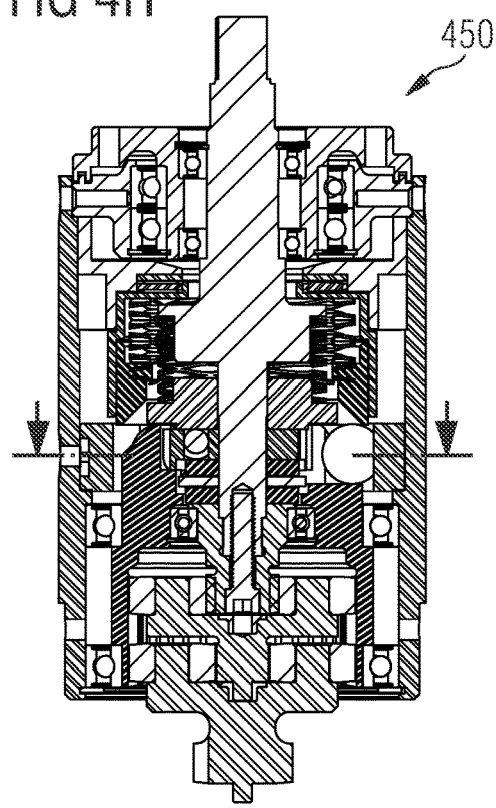
Figure 4F:
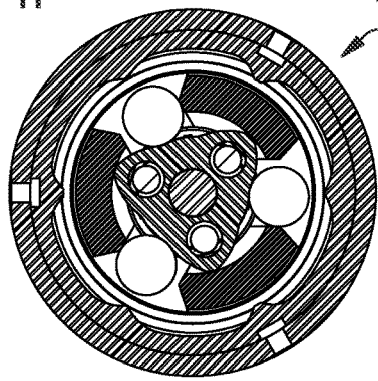
Figure 4I:
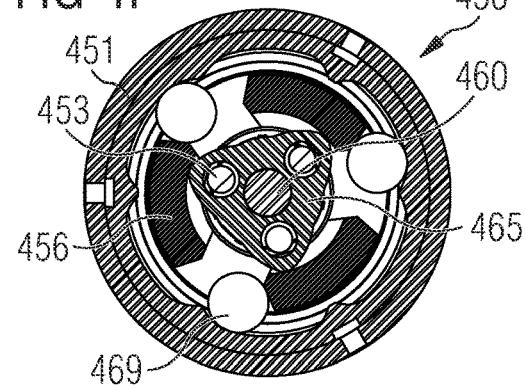

FIGS. 4D, 4E and 4F and 4G, 4H and 4I, by way of example, show side and horizontal and vertical cross-sectional views, respectively, of another embodiment of a torque-sensing centrifugal multi-speed automatic shifting assembly 450 of the present invention for use with Applicant's electrically or pneumatically operated torque guns. Assembly 450 uses an over-center type mechanism that results in crisp, rapid changes in the shifter position. FIGS. 4D, 4E and 4F show assembly 450 in HSLT mode. And FIGS. 4G, 4H and 4I show assembly 450 in LSHT mode.

Generally, torque-sensing centrifugal multi-speed automatic shifting assembly 450 may include many of the same components as torque-sensing centrifugal multi-speed automatic shifting assembly 400. Some differing components may include: flange(s); spring sleeve(s); spring cup(s); and thrust cup(s).

Specifically, torque-sensing centrifugal multi-speed automatic shifting assembly 450 includes: an intermediary housing 451; a bearing connector 452; a spider 453; a first and a second planetary stage sun gear 454A and 454B; a spring flange 455; a first and second stage housing, or ring gear, 456; a sun gear retaining screw 457; a thrust bearing flange 458; a spring sleeve 459; a motor shaft 460; a flange 461; a thrust race 462; ball bearings 463 and 464; steel balls 465; retaining rings 466, 467 and 468; drive coupling balls 469; needle thrust bearings 470 and 471; a thrust washer 472; retaining rings 473 and 474; ball bearings 475; outer wave spring 476; inner wave spring 477; ball bearings 478; and retaining ring 479.

Operation of torque-sensing centrifugal multi-speed automatic shifting assembly 450 powered by motor 440 is as follows. Rotation of spider 453 drives ring gear 456 via drive coupling ball 469. As torque increases, drive coupling balls 469 ride up ramps of spider 453 pushing on spring sleeve 459, which moves upward thereby compressing wave spring 476. Drive coupling balls 469 move radially outward in V-shaped slots of spider 453. Once the center of drive coupling balls 469 moves past straight sections of Y-shaped slots of ring gear 456, drive coupling balls 469 transition onto the ramped sections of the of Y-shaped slots of ring gear 456. Drive coupling balls 469 are rapidly ramped out and quickly jammed between the Y-shaped slots of ring gear 456 and intermediary housing 451. Intermediary housing 451 is coupled to ring gear 456 and spider 453 is decoupled from ring gear 456. Ball 465 works with spring flange 455 and spring 477 as an overrun clutch in case ball 469 hits the peak of wedge profile of intermediate house 451 while being pushed out by spider 453. This jamming situation will cause ball 465 to dislodge from ball groove in spring flange 455 pushing the spring flange 455 upwards until the next available ball groove rotates through and the ball 465 drop in place.

In other words, in HSLT mode, the motor shaft 460 is directly coupled to and drives ring gear 456 directly, bypassing the first and second stage planetary gears. The bypassing of the $1^{st}$ and $2^{nd}$ stages spins the $2^{nd}$ stage planetary set at motor speed. In LSHT mode, spider gear 453 decouples from ring gear 456, and intermediary housing 451 couples to ring gear 456. The gear ratio between input and output increases by the ratio of the first and second stage.

It is to be understood that there are numerous known types of components which may be used with automatic mode shifting assemblies of the present invention, like 300, 400 and 450.

Wobbling Turning Force Multiplication Assemblies. Applicant further invented a wobbling turning force multiplication assembly for use in its torque guns having two (or more) speeds, including HSLT and LSHT modes. Advantageously, wobbling turning force multiplication assemblies of the present invention are of an exceptionally compact and rugged design, and create very high reduction ratios, for example, from approximately 10:1 to approximately 3000:1, in a single stage.

FIGS. 5A and 5B, by way of example, show perspective and side, cross-sectional views of a wobbling turning force multiplication assembly 500 in gearbox assembly 590. FIG. 5C shows a perspective view of a first stage assembly 510 of assembly 500. FIG. 5D shows a perspective view of a second stage assembly 560 of assembly 500. FIGS. 5E and 5F show exploded perspective views of first and second stage assemblies 510 and 560. FIG. 5G shows an exploded perspective view of wobbling turning force multiplication assembly 500.

In this example, first stage eccentric gear assembly 510 includes: an intermediate housing 511; an eccentric gear 512; a ring gear 513 with sun gear drive extension 521; a planet gear assembly 514; flange bearings 515; a drive input shaft 516; needle bearings 517; plain sleeve bearings 518; dowel pins 519; and steel ball bearings 520. Drive input shaft 516 operatively connects a motor (not shown) to first stage assembly 510. Sun gear drive extension 521 operatively connects first stage assembly 510 to a planet gear housing 561 of second stage assembly 560.

In this example, eccentric gear 512 has 43 teeth; ring gear 513 with sun gear extension 521 has 44 teeth and 12 teeth, respectively; each planet gear of planet gear assembly 514 has 24 teeth; and drive input shaft 516 has 12 teeth. Indeed very high reduction ratios result during operation because, inter alia, eccentric gear 512 wobbles within ring gear 513 with sun gear drive extension 521.

In this example, second stage eccentric gear assembly 560 includes: planet gear housing 561; a planet gear assembly 562; planet gear bushings 563; a ring gear/square drive extension 564 with square drive extension 568; an eccentric gear 565; dowel pins 566; and an internal retaining ring 567. Square drive extension 564 operatively connects second state assembly 560 to a drive socket (not shown).

In this example, eccentric gear 565 has 32 teeth; ring gear 564 with sun gear extension 568 has 33 teeth; each planet gear of planet gear assembly 562 has 12 teeth; and sun gear extension 521 has 12 teeth. Indeed very high speed reduction ratios result during operation because, inter alia, eccentric gear 565 wobbles within ring gear 564 with square drive extension 568.

First and second stage assemblies 510 and 560 are located within gearbox assembly 590. Gearbox assembly 590 may include: a gear box housing 591; a gear box housing adapter 591; a ball bearing assembly 593; a gearbox assembly connector 594; a first and second bearing gearbox bearing 595A and 595B; a lock washer 596; a lock nut 597; a retaining ring 598; and a flange bearing 599.

In operation of wobbling turning force multiplication assembly 500, input shaft 516 drives planet gear assembly 514. Planet gear assembly 514 has an offset counterbore that causes eccentric (cycloidal sun) gear 512 to rotate on an eccentric path. This eccentric rotation creates a ratio of EQ-1, e.g. [ring gear/(ring gear−eccentric gear)] which causes intermediate (sun gear) housing 511 to rotate at a reduced speed. Sun gear drive extension 521 is subject to the reduction ratio drives which in turn drives planet gear assembly 562 invoking the same eccentric path and ratio as shown in EQ-1. This final output drives ring gear 564 concentric to gear box housing 591 transferring the output force to square drive extension 568.

It is to be understood that there are numerous known types of force multiplication mechanisms, or compound epicyclic gearing systems, which may be used with wobbling turning force multiplication assembly 500. These may include a plurality of outer planetary gears revolving about a central sun gear. The planetary gears may be mounted on movable carriers which themselves may rotate relative to the sun gear. Such compound epicyclic gearing systems may include outer ring gears which mesh with the planetary gears. Simple epicyclic gearing systems have one sun, one ring, one carrier, and one planetary set. Compound planetary gearing systems may include meshed-planetary structures, stepped-planet structures, and/or multi-stage planetary structures. Compared to simple epicyclic gearing systems, compound epicyclic gearing systems have the advantages of larger reduction ratio, higher torque-to-weight ratio, and more flexible configurations.

Turning force multiplication transmitter assemblies of the present invention may include: gear cages; planetary gears; ring gears; sun gears; wobble gears; cycloidal gears; epicyclic gears; connectors; spacers; shifting rings; retaining rings; bushings; bearings; caps; transmission gears; transmission shafts; positioning pins; drive wheels; springs; any combination or portion thereof; and/or other known like components as well. Note that turning force input shaft 516 also may be considered a turning force multiplication transmitter; specifically it's a first stage motor sun gear of first stage 510. Turning force multiplication assemblies are well known and disclosed and described. An example is disclosed and described in Applicant's U.S. Pat. No. 7,950,309, an entire copy of which is incorporated herein by reference.

Pneumatic Pressure Release, or Burst, Valve Assembly. The HYTORC® Z® Gun and all of Applicant's electric and pneumatic torque gun models are not immune to becoming wedged in place between a fastener and the point against which the tool reacts. In some instances a pneumatic torque gun stops with its air motor in such a position that torque is still applied to the fastener and force is present between the reaction arm and the reaction surface. Releasing such stuck tools is difficult and current products and methods result in substantial loss of bolt load upon removal.

FIGS. 6A, 6B, 6C and 6D, by way of example, show various views of a pneumatic pressure release valve assembly 600 of the present invention. It integrates into Applicant's pneumatic torque gun models and their control systems to facilitate such guns' removal after tightening a fastener. If a tool becomes stuck upon tightening, release valve assembly 600 is utilized to reverse pneumatic flow direction and thus tool rotation such that the tool is moved a small amount, inconsequential to bolt load. Indeed the tool rotates at a slight angle in the loosening direction. This releases the opposing forces applied to the tool by the recently tightened fastener and the reaction point.

Generally, release valve assembly 600 includes: an outer pneumatic valve portion 602; a middle pneumatic directional valve portion 603; an inner pneumatic valve portion

604; a pneumatic reversing valve portion 608; and a push button 609. Release valve assembly 600 also includes: a key stock 601 on outer pneumatic valve portion 602; a dowel pin 605; a Smalley crest to crest spring 606; and an internal retaining ring 607. Components of valve assembly 600 are integrated into and/or formed adjacent to a modified handle 10C and/or a modified rear tool handle cover 3C of a torque gun 1C and/or one of several other of Applicant's pneumatic torque guns.

Advantageously release valve assembly 600 releases force applied against a tool's reaction point by activating a single control button that reverse the tool's rotation while supplying a short controlled burst of air without loosening the fastener. The burst of air to motor 16C is delivered via the valve's reverse side. As explained below, release valve assembly 600 accepts that air even though the tool is still configured to operate in the forward direction. Indeed it reverses torque gun's 1C direction without pulling of a modified trigger 17C, which typically acts as an on/off pneumatic valve.

FIGS. 6F-6J, by way of example, show operation of release valve assembly 600. FIG. 6F shows button 609 on cover 3C used to actuate release valve assembly 600. An inlet port 691 from tool handle 17C is for reversing motor 16C. An air passage 692 connects to reversing valve 608. An air passage 694 connects reversing valve 608 to a rear cover passage 695. Directional valve 603 functions also as an air sleeve 693 and assists in opening and closing ports to reverse motor 16C.

FIG. 6G shows a forward side of reverse valve assembly 600. Reverse valve 608 is closed and an exhaust port 621 is closed. To redirect air to the valve assembly 600's reverse side it is necessary to open and close various ports and passages. This is accomplished by directional valve 603, which is moved by depressing button 609. Directional valve 603 is positioned for clockwise rotation, or tightening, as a driving port 624 is open. Valve assembly 600 is deactivated in this view. A handle inlet port 623 is open such that air flows to motor 16C when trigger 17C is depressed. Air sleeve 693 is in normal operating position.

FIG. 6H shows valve assembly 600's reverse side. It is not activated in this view. An exhaust port 626 is open in normal operating position with directional valve 603 positioned for clockwise rotation. An inlet port 627 for counterclockwise operation is closed by directional valve 603. Reverse valve 608 remains closed. Air sleeve 693 is in normal operating position.

FIG. 6I once again shows the valve assembly 600's forward side, this time with button 610 depressed. Depressing button 610 moves air sleeve 693 forward, opening reversing port 622 by opening reverse valve 608. This occurs while leaving air inlet 623 from trigger 17C in the closed position. Air sleeve 693 is now in the reverse mode. Exhaust port 628 to 615 allows air to flow from reversing port 622 across a reversing port passage 641. Normal exhaust port 621 is still closed by directional valve 603 as it has not been rotated.

FIG. 6J shows valve assembly 600's reverse side while button 609 is depressed. Air sleeve 693 is pushed forward, delivering air to the reverse side. Exhaust slots 631 are closed when reverse valve 608 is opened, which moves air sleeve 693 to the closed position. Air is forced through motor 16B in reverse, and out exhaust port 621 on the forward side, thereby reversing tool 1C a short amount. Note that five (5) exhaust ports 631 are shown.

Note that any suitable number of inlet and exhaust ports, slots, faces, passages, sleeves, sizes, materials, etc. may be used to control and optimize airflow through the torque wrench.

FIG. 6E shows another modified rear cover 3C1, an Applicant-designed custom human/electronic interface system with associated computer programs. It simplifies the tool's operation and provides a user-friendly method for making necessary adjustments and tool configuration changes. Note that modified rear cover 3C1 and components thereof may be used with any of Applicant's electric, hydraulic and/or pneumatic torque guns.

Pneumatic Fluid Directional Valve Assembly. The HYTORC® Z® Gun and all of Applicant's electric and pneumatic torque gun models require forward and reverse directions for tightening and loosening of threaded fasteners. As shown in FIGS. 7A, 7B and 7C, by way of example, Applicant further advanced its pneumatic torque gun models with development of a pneumatic fluid directional valve assembly 700 to increase ease of directional control of such tools. Generally, directional valve assembly 700 includes: an outer pneumatic valve portion 702; an inner pneumatic valve portion 704; and a push button rod assembly 706. Note that components of directional valve assembly 700 are integrated into and/or formed adjacent to a modified handle 10D of a torque gun 1D and/or one of several other of Applicant's pneumatic torque guns. Note that directional valve assembly 700 utilizes similar concept(s) found in pressure release valve assembly 600, of which operate in similar manner(s).

An operator changes directional flow of the pneumatic fluid by depressing push button rod assembly 706. A rack and pinion connection mechanism between inner pneumatic valve portion 704 and push button rod assembly 706 opens and/or closes various ports and passages of the components of directional valve assembly 700, and therefore allows the operator to control the flow of the pneumatic fluid. Springs 706A and 706B bias push button rod assembly 706 and assist in locking it in place once the operator chooses a tool direction. Any suitable number of ports, passages, faces, sizes, materials, etc. may be used to optimize directional flow through the torque wrench.

Outer pneumatic valve portion 702 is press fit in to modified handle 10D of torque gun 1D. Outer portion 702 has six independent ports (713, 714, 715, 716, 717 and 718). Inner pneumatic valve portion 704 has three distinct faces (710, 711 and 712). When an operator pushes push button rod assembly 706 in one direction 720, face 711 permits air to flow from port 713 to port 718 causing the pneumatic motor to rotate in the clockwise direction. The exhausted air passes through port 717 and is directed to port 714 by face 712 and exits handle 10D. When push button rod assembly 706 is pushed in another direction 721, face 710 permits air to flow from port 713 to port 715 causing the pneumatic motor to rotate in the counter-clockwise direction. The exhausted air passes through port 716 and is directed to port 716 by face 712. Note that any suitable number of ports, passages, sizes, materials, etc. may be used to optimize airflow through the torque wrench.

Pneumatic Fluid Directional and Activation, or Trigger, Lock Safety Assembly. The HYTORC® Z® Gun and all of Applicant's electric and pneumatic torque gun models require forward and reverse directions for tightening and loosening of threaded fasteners. They also must maintain and advance industry safety standards. As shown in FIGS. 8A and 8B, by way of example, Applicant further advanced its pneumatic torque gun models with development of a pneumatic fluid directional valve and activation, or trigger, lock safety assembly 800 to increase ease of directional control of the tools. Generally, pneumatic fluid directional valve and trigger lock safety assembly 800 includes: an outer pneumatic valve portion 802; an inner pneumatic valve portion 804; a push button rod assembly 808; a push button 810; and a trigger projection 814. Note that components of pneumatic fluid directional valve and trigger lock safety assembly 800 are integrated into and/or formed adjacent to a modified handle of a torque gun 1E and/or one of several other of Applicant's pneumatic torque guns. Note that pneumatic fluid directional valve and trigger lock safety assembly 800 utilizes similar concept(s) found in pressure release valve assembly 600 and directional valve assembly 700, of which operate in similar manner(s).

An operator changes directional flow of the pneumatic fluid by depressing push button rod assembly 808. A rack and pinion connection mechanism between inner pneumatic valve portion 804 and push button rod assembly 808 opens and/or closes various ports and passages of the components of pneumatic fluid directional valve and trigger lock safety assembly 800, and therefore allows the operator to control the flow of the pneumatic fluid. Springs 806A and 806B bias push button rod assembly 809 and assist in locking it in place once the operator chooses a tool direction. Any suitable number of inlet and exhaust ports, slots, faces, passages, sleeves, sizes, materials, etc. may be used to optimize directional flow through the torque wrench.

Trigger lock safety assembly components include: a first and a second indention 808A and 808B of push button rod assembly 806; and trigger projection 814. Tool 1E defaults to an inactive state. To activate tool 1E the operator must align either first or second indention 808A or 808B, depending on the desired direction, with trigger projection 814. Note that the operator must use two hands to activate tool 1E, one hand to operate push button rod assembly 806 and the other hand to operate trigger 17E. Note that any suitable number of inlet and exhaust ports, slots, faces, passages, sleeves, indentions, projections, sizes, materials, etc. may be used to optimize airflow through and safety of the torque wrench.

Pneumatic Tool Cycle Counter, or Odometer, Assembly. Recall FIG. 6E which shows modified rear cover 3C1. Such is an example of Applicant's recent focus of integrating modern electronics with industrial bolting systems. As shown in FIGS. 9A and 9B, Applicant further modified the rear covers of its pneumatic tool models, such as tool 1F. It simplifies the tools' operation and provides a user-friendly method for making necessary adjustments and configuration changes. One such advancement includes a pneumatic tool cycle counter, or odometer, assembly 900.

Generally, odometer assembly 900 includes: a pressure sensor/transducer assembly 901; portions of a micro-computer assembly 902 with associated computer programs; and a human/electronic interface assembly 903. Micro-computer assembly 902 processes data output by pressure sensor assembly 901 once tool 1E is activated. The principal of pneumatic tool cycle counter assembly 900 is based on the fact that, upon activation, internal pressure of tool 1E drops rapidly for a short period when the trigger is pulled. Micro-computer assembly 902 is, inter alia, programmed to recognize and record each such rapid pressure drop. These rapid pressure drops correlate to trigger pulls, or cycles, of tool 1E. Human/electronic interface assembly 903 displays a running total of these cycles on the LCD display.

Put another way, pressurized air enters an air supply assembly 990 of tool 1E through air supply connector assembly 991. Pressurized air passes through air supply tube 992 and enters pressure transducer air supply passages 993. Pressure sensor/transducer assembly 901 supplies a dc voltage signal to electronic circuits of micro-computer assembly 902. Internal pressure of torque gun 1E drops when trigger 17F is engaged and the air motor spins. This differential pressure is processed and recorded by a computer program embedded within micro-computer assembly 902, and displayed on human/electronic interface assembly 903.

Representative design parameters related to odometer assembly 900, by way of example, include the following. An actuation is defined as a small pressure drop (load pressure), within a predetermined range, based on the tool pressure just prior to operator use. Relatively large pressure drops, such as free run pressure and/or hose disconnect, and relatively small pressure drops, such as fluid line 'noise', are ignored. The valid pressure drop range for a given pressure lies between the load pressure drop and free run pressure drop values. Pressure changes following a valid actuation are ignored until the current pressure returns to a value close to the pre-activation level. All pressure increases are ignored. The actuation count value is in the range of 0 to 99,999, but the counter continues counting beyond 99,999. The full actuation counter value can be retrieved and/or reset to 0 using any suitable digital connection, such as USB, Bluetooth, WLAN, SMS, etc. The current count is retained even when micro-computer assembly 902 is turned off or loses power.

Final Thoughts. It will be understood that each of the elements described above, or two or more together, may also find a useful application in other types of constructions differing from the types described above. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof. Note that there may be slight differences in descriptions of numbered components in the specification.

While the invention has been illustrated and described as embodied in a fluid operated tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

When used in this specification and claims, the terms "comprising", "including", "having" and variations thereof mean that the specified features, steps or integers are included. The terms are not to be interpreted to exclude the presence of other features, steps or components.

What is claimed is:

1. A pneumatic fluid directional valve assembly for use with pneumatic torque tools for tightening and/or loosening threaded fasteners including: an outer pneumatic valve portion; an inner pneumatic valve portion; push button rod assembly; and wherein the outer pneumatic valve portion and the inner pneumatic valve portion, formed as a relatively rotatable unit actuated by the push button rod assembly, includes various inlet and exhaust ports, slots, faces, passages and sleeves which allow an operator to control and optimize directional airflow through the tool.

2. A pneumatic torque tool for tightening and/or loosening threaded fasteners including a valve assembly according to claim 1 integrated with and/or formed within the tool.

3. A valve assembly according to claim 1 integrated into and/or formed adjacent to a modified handle of the tool.

4. A valve assembly according to claim 1 wherein an operator changes directional flow of the pneumatic fluid by depressing the push button rod assembly.

5. A valve assembly according to claim 1 including a rack and pinion connection mechanism integrated into and/or formed adjacent to the inner pneumatic valve portion and the push button rod assembly to open and/or close various ports and passages of the components of the valve assembly which allows an operator to control the flow of the pneumatic fluid.

6. A valve assembly according to claim 1 wherein the push button rod assembly includes springs which bias the push button rod assembly and assist in locking it in place once an operator chooses a direction of the tool.

7. A valve assembly according to claim 1 wherein the outer pneumatic valve portion has six independent ports and the inner pneumatic valve portion has three distinct faces.

8. A valve assembly according to claim 1 wherein when an operator pushes the push button rod assembly in a first direction, a first face permits the pneumatic fluid to flow from a first port to a second port causing a motor of the tool to rotate in a clockwise direction.

9. A valve assembly according to claim 8 wherein the pneumatic fluid passes through a third port and is directed to a fourth port by a second face and exits the tool.

10. A valve assembly according to claim 1 wherein when an operator pushes the push button rod assembly in a second direction, a third face permits the pneumatic fluid to flow from a first port to a fifth port causing a motor of the tool to rotate in the counter-clockwise direction.

11. A valve assembly according to claim 10 wherein the pneumatic fluid passes through a sixth port and is directed to the sixth port by a second face.

12. A pneumatic fluid directional and trigger lock safety valve assembly for use with pneumatic torque tools for tightening and/or loosening threaded fasteners including: an outer pneumatic valve portion; an inner pneumatic valve portion; a push button rod assembly; trigger lock safety assembly; wherein the outer pneumatic valve portion and the inner pneumatic valve portion, formed as a relatively rotatable unit actuated by a push button of the push button rod assembly, includes various inlet and exhaust ports, slots, faces, passages and sleeves which allow an operator to control and optimize directional airflow through the tool; and wherein a first and a second indention formed on the push button rod assembly and a trigger projection require the operator to align the indentions with the trigger projection, depending on the desired direction, to activate the tool.

13. A pneumatic torque tool for tightening and/or loosening threaded fasteners including a directional safety valve assembly according to claim 12 integrated with and/or formed within the tool.

14. A valve assembly according to claim 12 integrated into and/or formed adjacent to a modified handle of the tool.

15. A directional safety valve assembly according to claim 12 wherein an operator changes directional flow of the pneumatic fluid by depressing the push button rod assembly.

16. A directional safety valve assembly according to claim 12 including a rack and pinion connection mechanism integrated into and/or formed adjacent to the inner pneumatic valve portion and the push button rod assembly to open and/or close various ports and passages of the components of the valve assembly which allows an operator to control the flow of the pneumatic fluid.

17. A directional safety valve assembly according to claim 12 wherein the push button rod assembly includes springs which bias the push button rod assembly and assist in locking it in place once an operator chooses a direction of the tool.

18. A directional safety valve assembly according to claim 12 wherein the outer pneumatic valve portion has six independent ports and the inner pneumatic valve portion has three distinct faces.

19. A directional safety valve assembly according to claim 12 wherein when an operator pushes the push button rod assembly in a first direction, a first face permits the pneumatic fluid to flow from a first port to a second port causing a motor of the tool to rotate in a clockwise direction.

20. A directional safety valve assembly according to claim 19 wherein the pneumatic fluid passes through a third port and is directed to a fourth port by a second face and exits the tool.

21. A directional safety valve assembly according to claim 12 wherein when an operator pushes the push button rod assembly in a second direction, a third face permits the pneumatic fluid to flow from a first port to a fifth port causing a motor of the tool to rotate in the counter-clockwise direction.

22. A directional safety valve assembly according to claim 21 wherein the pneumatic fluid passes through a sixth port and is directed to the sixth port by a second face.

23. A directional safety valve assembly according to claim 12 wherein the tool defaults to an inactive state.

24. A directional safety valve assembly according to claim 12 including the trigger lock safety assembly having a first and a second indention of the push button rod assembly and a trigger projection.

25. A directional safety valve assembly according to claim 24 wherein to activate the tool an operator must align either the first or the second indention, depending on the desired direction, with the trigger projection.

26. A directional safety valve assembly according to claim 24 wherein the tool is configured such that an operator must use two hands to activate the tool, one hand to operate the push button rod assembly and an other hand to operate a trigger of the tool.

* * * * *